United States Patent
Takahashi

(10) Patent No.: US 11,561,679 B2
(45) Date of Patent: Jan. 24, 2023

(54) DISPLAY CONTROL SYSTEM, DISPLAY CONTROL METHOD, AND PROGRAM FOR PAGE ARRANGEMENT OF INFORMATION ITEMS

(71) Applicant: Rakuten Group, Inc., Tokyo (JP)

(72) Inventor: Emi Takahashi, Tokyo (JP)

(73) Assignee: Rakuten Group Inc., Tokyo (JP)

( * ) Notice: Subject to any disclaimer, the term of this patent is extended or adjusted under 35 U.S.C. 154(b) by 65 days.

(21) Appl. No.: 16/321,538

(22) PCT Filed: Nov. 9, 2017

(86) PCT No.: PCT/JP2017/040497
§ 371 (c)(1),
(2) Date: Jan. 29, 2019

(87) PCT Pub. No.: WO2019/092838
PCT Pub. Date: May 16, 2019

(65) Prior Publication Data
US 2021/0333956 A1    Oct. 28, 2021

(51) Int. Cl.
*G06F 3/00* (2006.01)
*G06F 3/0483* (2013.01)
(Continued)

(52) U.S. Cl.
CPC .......... *G06F 3/0483* (2013.01); *G06F 3/0482* (2013.01); *G06F 3/0488* (2013.01)

(58) Field of Classification Search
CPC ..... G06F 3/0483; G06F 3/0482; G06F 3/0488
See application file for complete search history.

(56) References Cited

U.S. PATENT DOCUMENTS 8,572,476 B2 * 10/2013 Yi .................. G06F 3/016
715/234
8,972,903 B2 * 3/2015 James ............ G06F 1/1643
715/863

(Continued)

FOREIGN PATENT DOCUMENTS

JP    2005-293276 A    10/2005

OTHER PUBLICATIONS

Extended European Search Report dated Oct. 15, 2020 issued by the European Patent Office in Application No. 17 91 7219.2.

*Primary Examiner* — Kieu D Vu
*Assistant Examiner* — Andrew Chung
(74) *Attorney, Agent, or Firm* — Sughrue Mion, PLLC

(57) ABSTRACT

A display control system specifies, in a case where one of a plurality of individual information items associated with a common information item is specified, the common information item associated with the specified individual information item, and other individual information items associated with the common information item. The display control system determines an order of the specified individual information item, the common information item, and the other individual information items such that the specified individual information item is positioned between the common information items and the other individual information items. In a case where a page turning operation is performed in a predetermined direction, the display control system displays pages of the other individual information items. In a case where the page turning operation is performed in a direction opposite to the predetermined direction, the display control system displays the page of the common information item.

15 Claims, 27 Drawing Sheets

(51) Int. Cl.
 *G06F 3/0482* (2013.01)
 *G06F 3/0488* (2022.01)

(56) References Cited

U.S. PATENT DOCUMENTS

| | | | | |
|---|---|---|---|---|
| 9,477,381 | B2* | 10/2016 | Harvey | G06F 3/0488 |
| 11,099,715 | B2* | 8/2021 | Hahn | G06F 3/017 |
| 2004/0055446 | A1 | 3/2004 | Robbin et al. | |
| 2009/0119614 | A1 | 5/2009 | Tienvieri et al. | |
| 2009/0204928 | A1* | 8/2009 | Kallio | G06F 3/0481 |
| | | | | 715/799 |
| 2010/0095240 | A1* | 4/2010 | Shiplacoff | G06F 3/04842 |
| | | | | 715/784 |
| 2010/0211872 | A1* | 8/2010 | Rolston | G06F 9/451 |
| | | | | 715/702 |
| 2012/0083260 | A1* | 4/2012 | Arriola | G06F 3/04883 |
| | | | | 455/418 |
| 2013/0076649 | A1* | 3/2013 | Myers | G06F 3/0412 |
| | | | | 345/173 |
| 2013/0205243 | A1* | 8/2013 | Rivera | G07F 17/305 |
| | | | | 715/776 |
| 2013/0222274 | A1* | 8/2013 | Mori | B60K 35/00 |
| | | | | 345/173 |
| 2013/0254705 | A1* | 9/2013 | Mooring | G06F 3/0482 |
| | | | | 715/784 |
| 2015/0113480 | A1* | 4/2015 | Krikke | G06F 3/0485 |
| | | | | 715/830 |
| 2015/0186397 | A1* | 7/2015 | Cueto | G06F 16/168 |
| | | | | 715/854 |
| 2015/0243067 | A1* | 8/2015 | Ishikawa | G06F 1/163 |
| | | | | 345/473 |
| 2016/0041713 | A1* | 2/2016 | Kim | G06F 3/0483 |
| | | | | 715/776 |
| 2016/0179798 | A1* | 6/2016 | Franks | G06F 3/04883 |
| | | | | 715/739 |
| 2016/0188615 | A1* | 6/2016 | Lenahan | G06F 3/0485 |
| | | | | 707/722 |
| 2016/0334978 | A1* | 11/2016 | Persson | H04L 67/141 |
| 2016/0357714 | A1* | 12/2016 | Greenberg | G06Q 30/06 |
| 2017/0017634 | A1* | 1/2017 | Levine | G06F 3/04847 |
| 2018/0088788 | A1* | 3/2018 | Cheung | G06F 3/04855 |

* cited by examiner

FIG.10

| HOTEL ID | DATA CLASS | TYPE | HOTEL INFORMATION ||||||
|---|---|---|---|---|---|---|---|---|
| | | | HOTEL NAME | ADDRESS | CONTACT | IMAGE | FACILITIES | |
| h00001 | PROVIDER | HOTEL | HOTEL A | TOKYO··· | 03-XXXX-XXXX | AAA.jpg | HOT SPRING··· | ··· |
| h00002 | PROVIDER | HOTEL | HOTEL B | TOKYO··· | 03-YYYY-YYYY | BBB.jpg | SPA··· | ··· |
| h00003 | PROVIDER | HOTEL | HOTEL C | TOKYO··· | 03-ZZZZ-ZZZZ | CCC.jpg | GYM··· | ··· |
| ··· | ··· | ··· | ··· | ··· | ··· | ··· | ··· | ··· |

| ROOM ID | DATA CLASS | TYPE | CATEGORY | ROOM INFORMATION | | | | | |
|---|---|---|---|---|---|---|---|---|---|
| | | | | ROOM TYPE | CAPACITY | LAYOUT | SIZE | BATHROOM | ... |
| r00001 | ITEM | ROOM | DOUBLE ROOM | DOUBLE ROOM a1 | 2 | a1.jpg | 35m² | YES | ... |
| r00002 | ITEM | ROOM | DOUBLE ROOM | DOUBLE ROOM a2 | 2 | a2.jpg | 40m² | YES | ... |
| r00003 | ITEM | ROOM | SUITE ROOM | SUITE ROOM a3 | 4 | a3.jpg | 100m² | YES | ... |
| ... | ... | ... | ... | ... | ... | ... | ... | ... | ... |

| HOTEL ID | ROOM ID |
|---|---|
| h00001 | r00001 |
| | r00002 |
| | r00003 |
| | r00004 |
| | . . . |
| h00002 | r00020 |
| | r00021 |
| | r00022 |
| | r00023 |
| | . . . |
| h00003 | r00031 |
| | r00032 |
| | r00033 |
| | r00034 |
| | . . . |

DB3

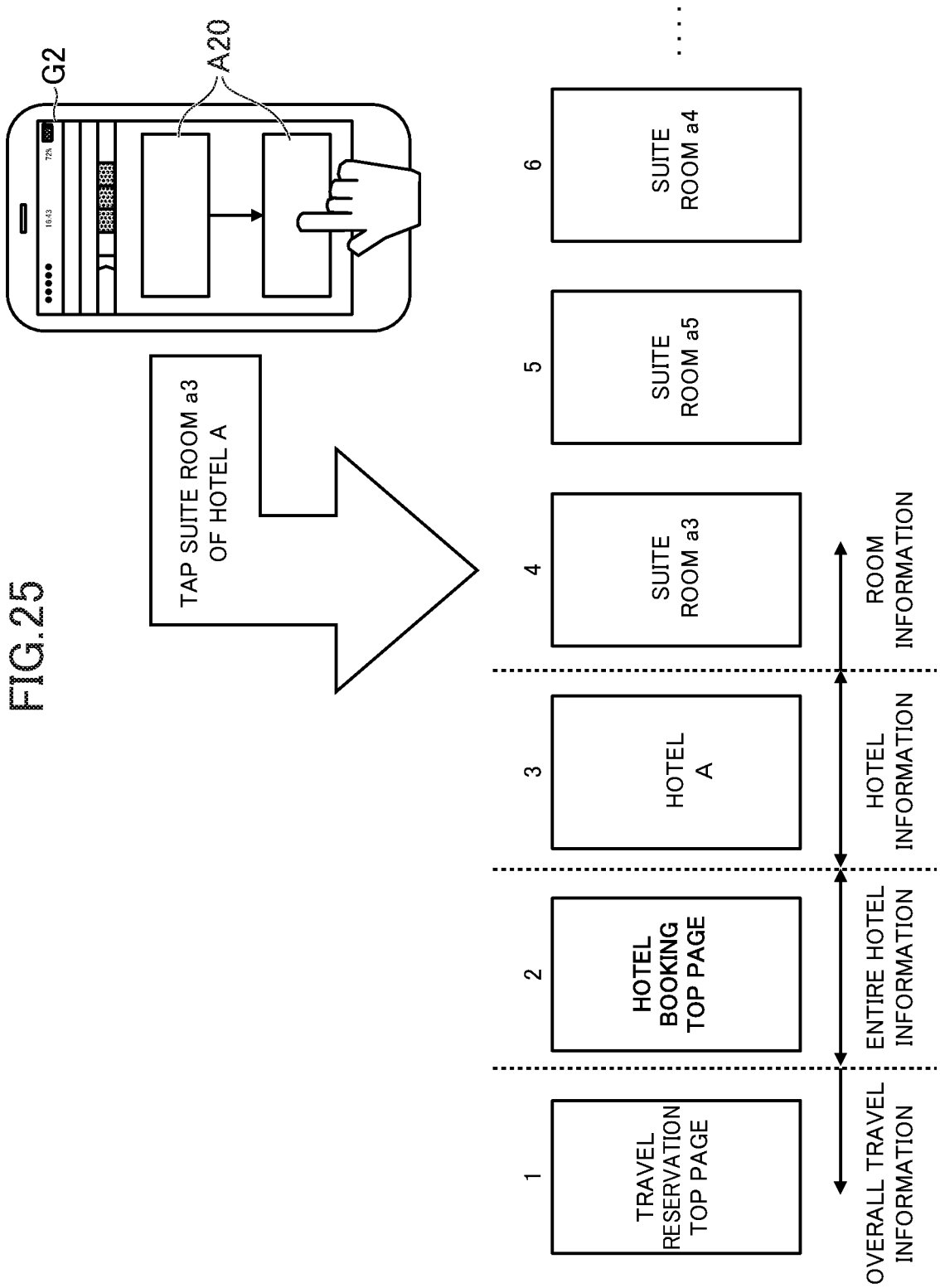

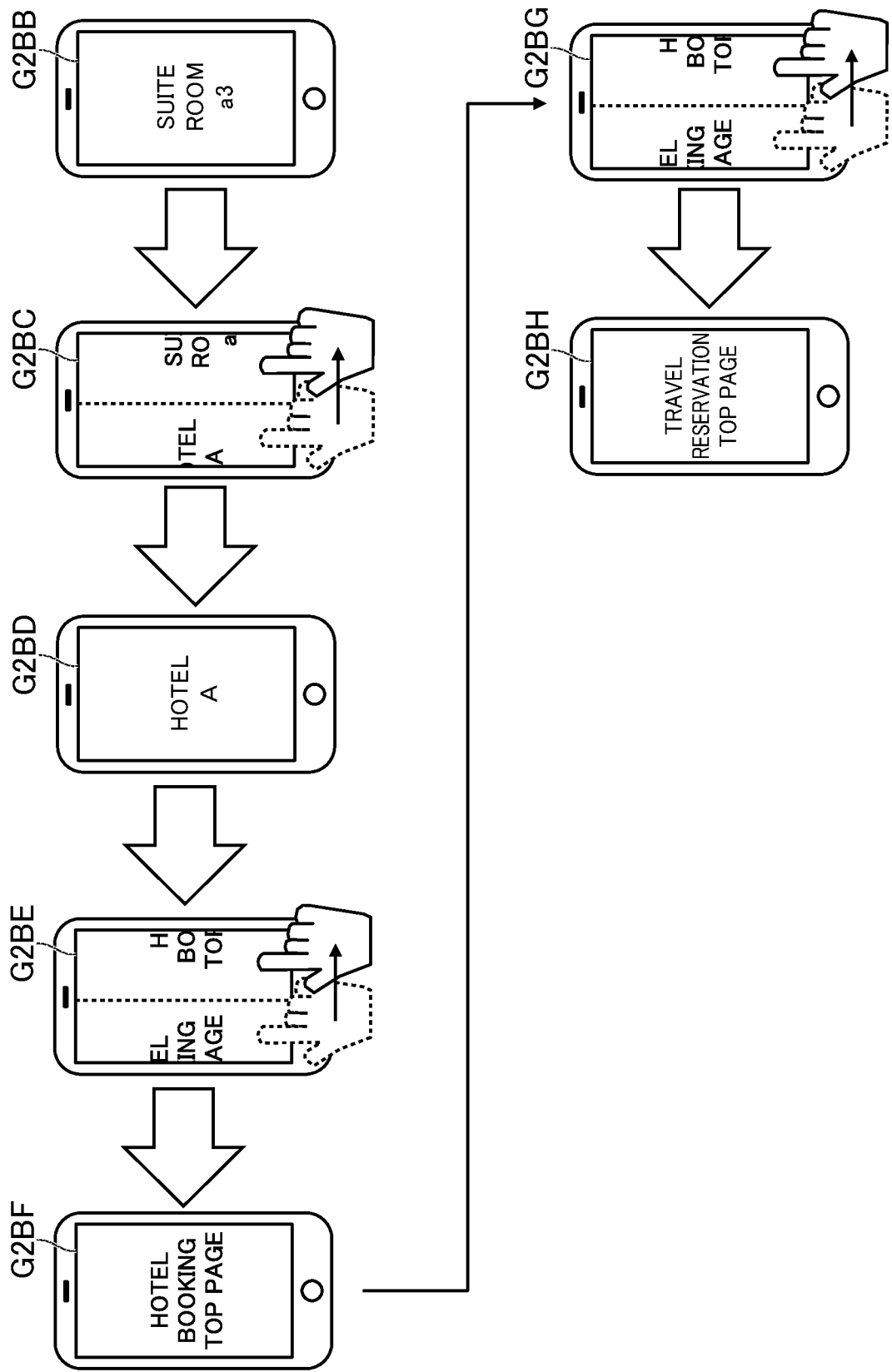

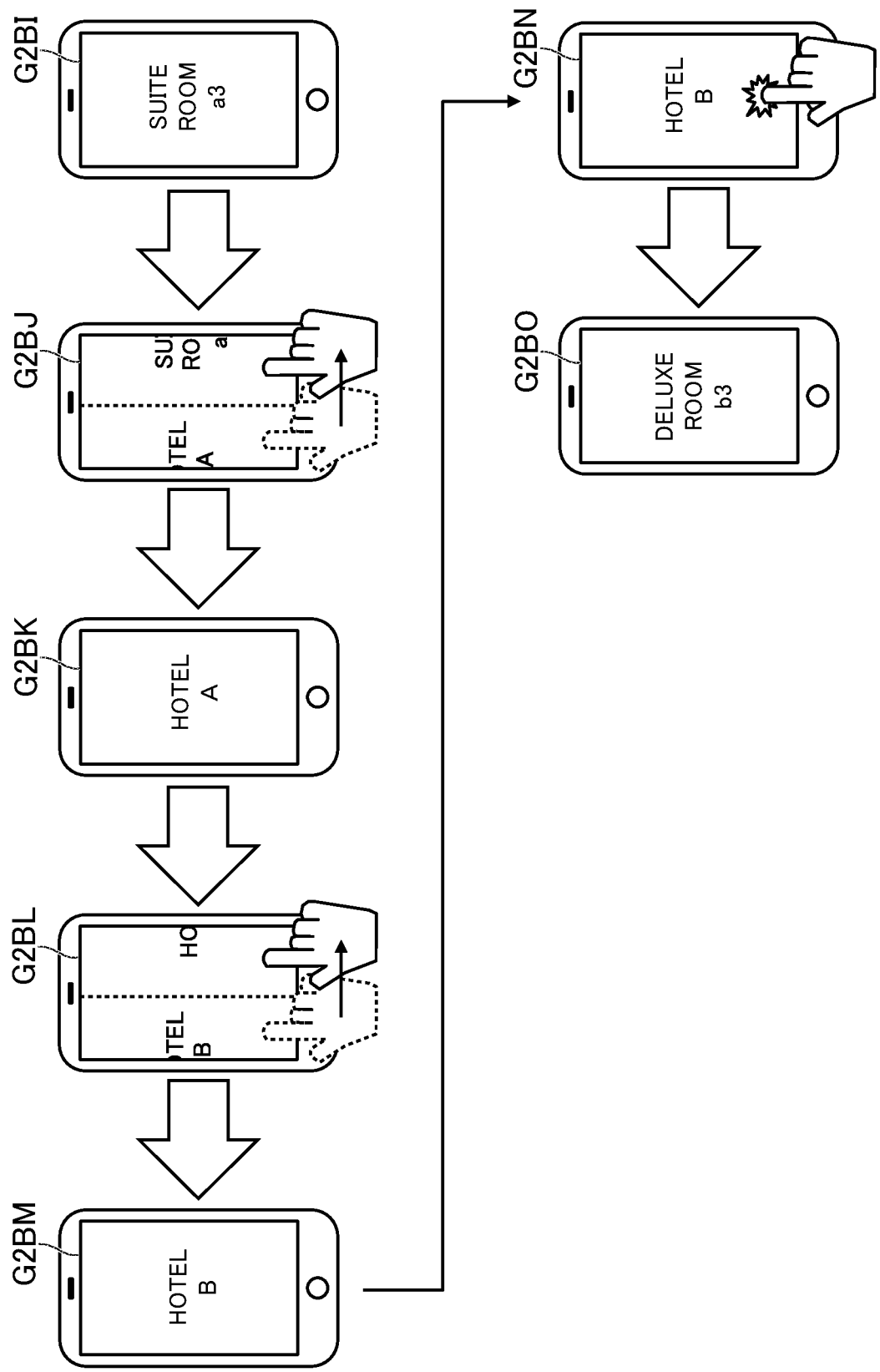

DISPLAY CONTROL SYSTEM, DISPLAY CONTROL METHOD, AND PROGRAM FOR PAGE ARRANGEMENT OF INFORMATION ITEMS

CROSS REFERENCE TO RELATED APPLICATIONS

This is a National Stage of International Application No. PCT/JP2017/040497 filed Nov. 9, 2017.

TECHNICAL FIELD

The present invention relates to a display control system, a display control method, and a program.

BACKGROUND ART

Display control systems have been known that associate a common information item with a plurality of individual information items. For example, Patent Literature 1 describes the system for associating hotel information (common information) indicating general information of a booked hotel with room information (individual information) indicating details of rooms of the hotel, and displaying an electronic pamphlet including these pages arranged in the predetermined order. For example, a user looks for a page of the room to stay in the electronic pamphlet, and checks the room information. Further, the user can check the hotel information by a page turning operation, and compare the room information with other room's information.

CITATION LIST

Patent Literature

Patent Literature 1: JP2005-293276A

SUMMARY OF INVENTION

Technical Problem

However, in Patent Literature 1, the page order of the electronic pamphlet is fixed, and thus the desired information is not necessarily found in proximity to the page of the room to be stayed. For example, even though room information of other rooms are found in proximity to the page of the room to be stayed, if the hotel information is not found in proximity to the room to be stayed, the user needs to repeat page turning operations in order to move to the page of the hotel information. In the technology of Patent Literature 1, the hotel information (common information) and the room information (individual information) are not designed to be readily seen, and thus the user's operation tends to be complicated.

One or more embodiments of the present invention have been conceived in view of the above, and an object thereof is to provide a display control system, a display control method, and a program capable of reducing burden of operation on the user.

Solution to Problem

In order to solve the above described problems, a display control system according to the present invention includes specifying means for, in a case where one of a plurality of individual information items associated with a common information item is specified, specifying the common information item associated with the specified individual information item, and other individual information items associated with the common information item, determining means for determining an order of the specified individual information item, the common information item, and the other individual information items such that the specified individual information item is positioned between the common information items and the other individual information items, and display control means for displaying a page of the specified individual information item on display means. In a case where a page turning operation is performed in a predetermined direction while the page of the specified individual information item is displayed, the display control means displays pages of the other individual information items, and, in a case where the page turning operation is performed in a direction opposite to the predetermined direction while the page of the specified individual information item is displayed, the display control means displays the page of the common information item.

A display control method according to the present invention includes a specifying step of specifying, in a case where one of a plurality of individual information items associated with a common information item is specified, the common information item associated with the specified individual information item, and other individual information items associated with the common information item, a determining step of determining an order of the specified individual information item, the common information item, and the other individual information items such that the specified individual information item is positioned between the common information items and the other individual information items, and a display control step of displaying a page of the specified individual information item on display means, wherein in the display control step. In a case where a page turning operation is performed in a predetermined direction while the page of the specified individual information item is displayed, pages of the other individual information items are displayed, and, in a case where the page turning operation is performed in a direction opposite to the predetermined direction while the page of the specified individual information item is displayed, the page of the common information item is displayed.

A program according to the present invention for causing a computer to function as specifying means for, in a case where one of a plurality of individual information items associated with a common information item is specified, specifying the common information item associated with the specified individual information item, and other individual information items associated with the common information item, determining means for determining an order of the specified individual information item, the common information item, and the other individual information items such that the specified individual information item is positioned between the common information items and the other individual information items, and display control means for displaying a page of the specified individual information item on display means. In a case where a page turning operation is performed in a predetermined direction while the page of the specified individual information item is displayed, the display control means displays pages of the other individual information items. In a case where the page turning operation is performed in a direction opposite to the predetermined direction while the page of the specified individual information item is displayed, the display control means displays the page of the common information item.

An information storage medium according to the present invention is a computer-readable information storage medium in which the program is stored.

In an aspect of the present invention, each common information item is associated with three or more individual information items, and the display control means sequentially displays the other individual information items each time a page turning operation is performed in the predetermined direction while the page of the specified individual information item is displayed.

In an aspect of the present invention, each common information item is associated with three or more individual information items, and the determining means determines the order of the other individual information items based on the specified individual information item.

In an aspect of the present invention, each common information item is associated with three or more individual information items, and the determining means determines the order of the other individual information items based on a category of the specified individual information item and categories of the respective other individual information items.

In an aspect of the present invention, the display control means displays again the page of the specified individual information item in a case where the page turning operation is performed in the predetermined direction while the page of the common information item is displayed.

In an aspect of the present invention, the display control means displays pages of other common information items in a case where the page turning operation is performed in the opposite direction while the page of the specified common information item is displayed.

In an aspect of the present invention, the specified common information item is associated with an entire information item with which the other common information items are associated, and the display control means displays a page of the entire information item in a case where the page turning operation is performed in the opposite direction while a page of one of the other common information items is displayed, the one of the other common information items being furthest from the specified common information item.

In an aspect of the present invention, the specified common information item is associated with the entire information item with which the other common information items are associated, and the display control means displays the page of the entire information item in a case where the page turning operation is performed in the opposite direction while the page of the specified common information item is displayed.

In an aspect of the present invention, the display control means displays the pages of the other common information items in a case where the page turning operation is performed in the predetermined direction while the page of the specified common information item is displayed.

In an aspect of the present invention, the specified common information item is associated with the entire information item with which the other common information items are associated, and the display control means displays the page of the entire information item in a case where the page turning operation is performed in the opposite direction while the page of the specified common information item is displayed.

In an aspect of the present invention, the specified common information item is associated with the entire information item with which the other common information items are associated. The entire information item is associated with an overall information item with which other entire information items are associated. The display control means displays the page of the entire information item in a case where the page turning operation is performed in the opposite direction while the specified common information item is displayed. The display control means displays a page of the overall information item in a case where the page turning operation is performed in the opposite direction while the entire information item is displayed.

In an aspect of the present invention, in a case where a page of one of the other common information items is displayed and then specified, the display control means displays pages of the individual information items associated with the specified common information item.

In an aspect of the present invention, the display control means displays the pages of the individual information items associated with the specified common information item based on the specified individual information item.

In an aspect of the present invention, each common information item is associated with three or more individual information items, and the display control means displays some of the other individual information items based on the specified individual information item.

In an aspect of the present invention, the display control system further includes processing executing means that executes predetermined processing in a case where a page of one of the individual information items is displayed on the display means and specified by a user based on the specified individual information item.

In an aspect of the present invention, the individual information item is information relating to a product or a service, and the common information item is information relating to a provider of the product or the service.

In an aspect of the present invention, the page turning operation is performed by changing a touch position on a touch panel.

Advantageous Effects of Invention

According to the present invention, burden of operation on a user can be reduced.

BRIEF DESCRIPTION OF DRAWINGS

FIG. 10 is a diagram illustrating an example of data stored in a hotel information database;

FIG. 11 is a diagram illustrating an example of data stored in a room information database;

FIG. 12 is a diagram illustrating an example of data stored in an association database;

FIG. 25 a diagram illustrating order of pages in Embodiment 3;

FIG. 26 is a diagram illustrating the itinerary screen changing when a user swipes right; and FIG. 27 is a diagram illustrating the itinerary screen changing in Embodiment 4.

DESCRIPTION OF EMBODIMENTS

1. Embodiment 1

Embodiments of a display control system according to the present invention will be described below in detail with reference to the accompanying drawings.

1-1. Overall Configuration of Display Control System

Figure 1:
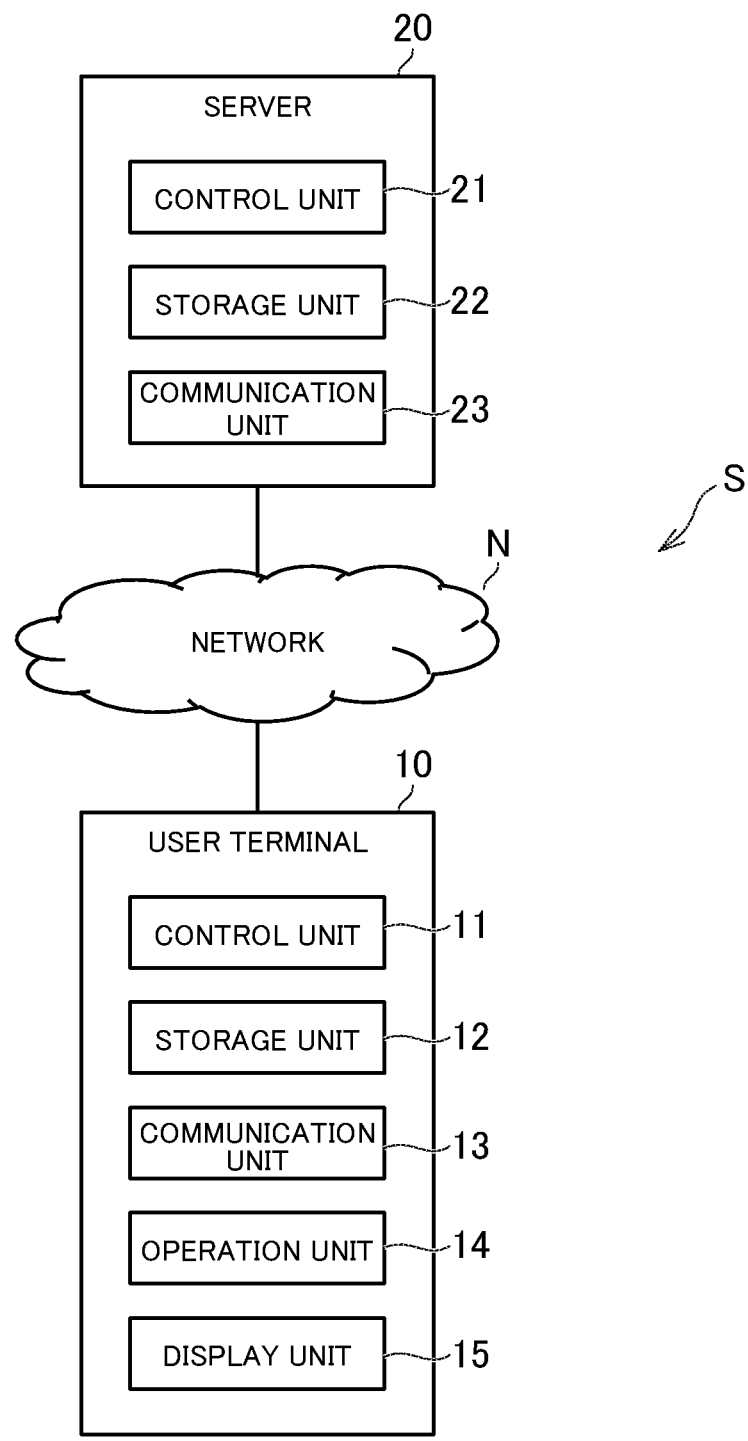
FIG. 1 is a diagram illustrating an overall configuration of a display control system.

FIG. 1 is a diagram illustrating an overall configuration of the display control system. As shown in FIG. 1, the display control system S includes a user terminal 10 and a server 20, each connectable to a network N, such as the Internet. FIG. 1 shows one user terminal 10 and one server 20, although a plurality of them may be provided.

The user terminal 10 is a computer operated by a user. In this embodiment, a case is explained in which the user terminal 10 is a mobile phone (including a smartphone) or a mobile information terminal (including a tablet computer) having a touch panel, although the user terminal 10 may not have a touch panel, and may be, for example, a personal computer. In this embodiment, the user terminal 10 includes a control unit 11, a storage unit 12, a communication unit 13, an operation unit 14, and a display unit 15.

The control unit 11 includes at least one microprocessor. The control unit 11 executes processing according to programs and data stored in the storage unit 12. The storage unit 12 includes a main storage unit and an auxiliary storage unit. For example, the main storage unit is a volatile memory, such as a RAM, and the auxiliary storage unit is a nonvolatile memory, such as a ROM, an EEPROM, a flash memory, and a hard disk.

The communication unit 13 is a wired or wireless communication interface for data communications through a network. The operation unit 14 is an input device for a user to perform operations, for example, a pointing device such as a touch panel and a mouse, a keyboard, and a button. The operation unit 14 transmits an operation of the user to the control unit 11. The display unit 15 is, for example, a liquid crystal display unit or an organic EL display unit. The display unit 15 displays images based on instructions from the control unit 11.

The server 20 is a server computer. The server 20 includes a control unit 21, a storage unit 22, and a communication unit 23. The control unit 21, the storage unit 22, and the communication unit 23 may respectively have the same physical constructions as the control unit 11, the storage unit 12, and the communication unit 13.

The programs or data described as being stored in the storage units 12 and 22 may be provided through the network N. The hardware configuration of each of the above computers is not limited to the above examples, and various types of hardware can be applied. For example, the hardware may include a reader (e.g., optical disc drive or memory card slot) for a computer-readable information storage medium, and an input/output unit (e.g., USB port) for inputting/outputting data to/from external devices. For example, programs and data stored in an information storage medium may be provided to each computer through the reader or the input/output unit.

1-2. Overview of Embodiment 1

In Embodiment 1, an example will be described in which the display control system S is applied to a travel reservation service. The travel reservation service is a service for assisting users in overall travel related reservations, and includes a plurality of services, such as hotel reservation, restaurant reservation, and optional tour reservation. The display control system S may be applicable to any services other than the travel reservation, such as electronic commerce, electronic books, and financial services.

In the display control system S, each common information item is associated with a plurality of individual information items. A common information item is information common to a plurality of individual information items associated with the common information itself, and for example, information related to a provider of a product or a service. The provider is a party that provides users with their products or services, and includes, for example, hotels, restaurants, shops, and companies. An individual information item is information associated with the common information item and relates to, for example, products or services.

In this embodiment, hotel information relating to hotels will be described as an example of the common information item, and room information relating to each of rooms in the hotels will be described as an example of the individual information items. As such, in the following, a description of hotel information can be replaced with common information, and a description of room information can be replaced with individual information.

The hotel information is basic information of hotels, and includes, for example, a hotel's name, address, contact information, image of building, facilities in the property, rate ranges, and consumer reviews. The room information is basic information of each room, and includes, for example, a type, a capacity, a layout, a size, with or without bathroom, and a description on the room.

In this embodiment, hotels are used as an example of accommodations, although accommodations are not limited to hotels, and may be, for example, inns, private lodging, and guest-houses. When the display control system S is applied to travel reservation services as in this embodiment, the common information and the individual information may be any information relating to the travel reservation, such as information other than accommodations.

For example, the common information may be restaurant information, and the individual information may be information on restaurant menus. For example, the common information may be information on companies providing optional tours, and the individual information may be information on each optional tour. For example, the common information may be information about an entire region, and the individual information may be information about sightseeing spots and restaurants in the region. As described above, the common information and the individual information may have correlative relationship such that a common information item relates to all of individual information items.

In the Embodiment 1, a user can change and arrange an itinerary prepared in advance according to their preference. For example, the user can select an itinerary as a basic itinerary from an itinerary list, and change a room of the hotel included in the itinerary to another room. In this way, the user sequentially selects information items displayed on the user terminal 10, thereby customizing their preferred itinerary.

Figure 2:
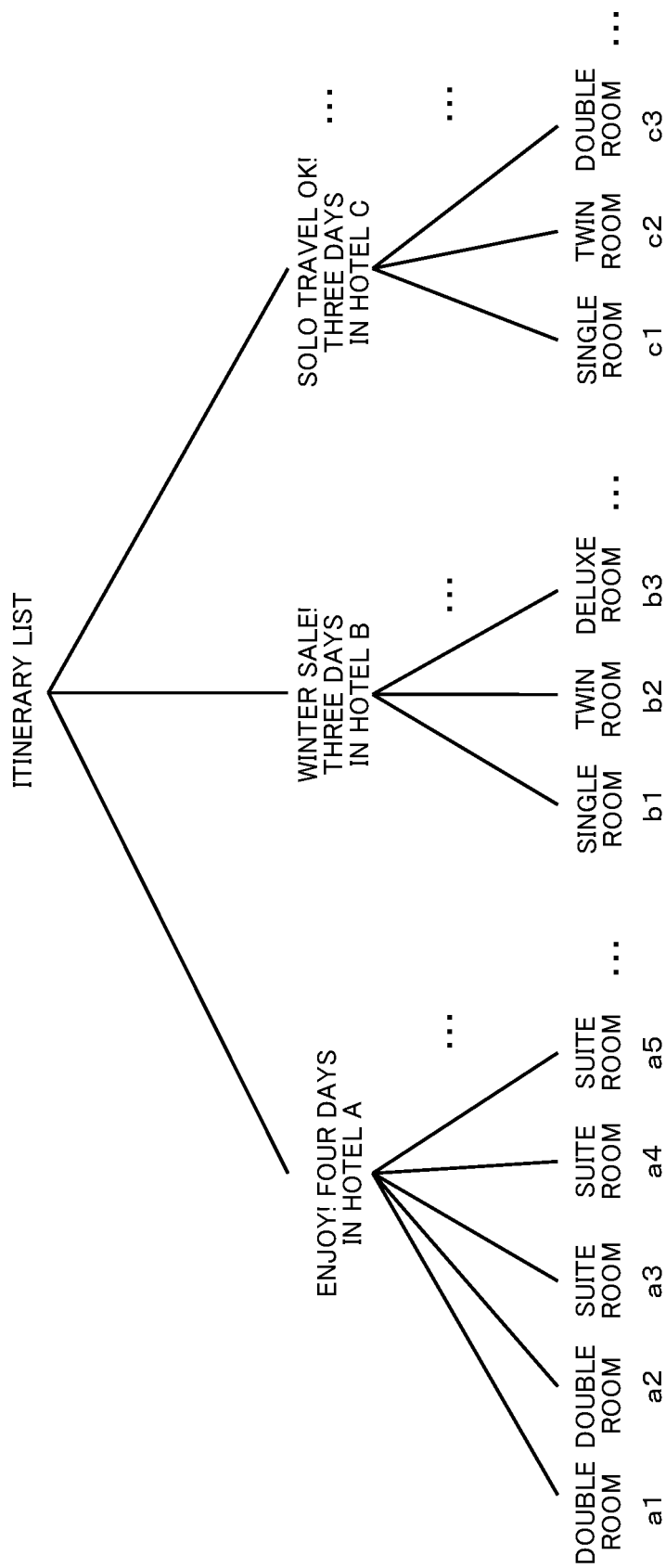
FIG. 2 is a conceptual diagram of information in this embodiment.

FIG. 2 is a conceptual diagram of information in this embodiment. As shown in FIG. 2, the user terminal 10 displays an itinerary list of basic itineraries. The itinerary list displays names of selectable itineraries, such as, "Enjoy! Four days in hotel A", "Winter sale! Three days in hotel B", and "Solo travel OK! Three days in hotel C".

For example, the itinerary titled "Enjoy! Four days in hotel A" includes one of the rooms in the hotel A as a basic room. For example, the itinerary titled "Winter sale! Three days in hotel B" includes one of the rooms in the hotel B as a basic room. For example, the itinerary titled "Solo travel OK! Three days in hotel C" includes one of the rooms in the hotel C as a basic room. As such, the hotel information (information having a class being "provider" and a type being "hotel" as shown in FIG. 10 described later) includes at least information items about hotels A to C.

In this embodiment, the user selects one of the itineraries in the itinerary list, and then can change a basic room included in the selected itinerary to another room in the same hotel. For example, in the example of FIG. 2, if the itinerary titled "Enjoy! Four days in hotel A" includes "suite room a3" as a basic room, the user selects the itinerary from the itinerary list and then can change the basic "suite room a3" to another room, such as "suite room a4" and "suite room a5." As such, the room information (information having a class being "item", and a type being "room" as shown in FIG. 11 described later) includes at least information items about rooms of hotels A to C.

In Embodiment 1, using the information in the concept described as above, the travel reservation service is provided to the user. For example, when the user operates the user terminal 10 to access the server 20, an itinerary list screen for the user to select a basic itinerary is displayed on the display unit 15. In the following, the screen may be displayed as a screen of a travel booking application stored in the user terminal 10, or a screen of a web browser.

Figure 3:
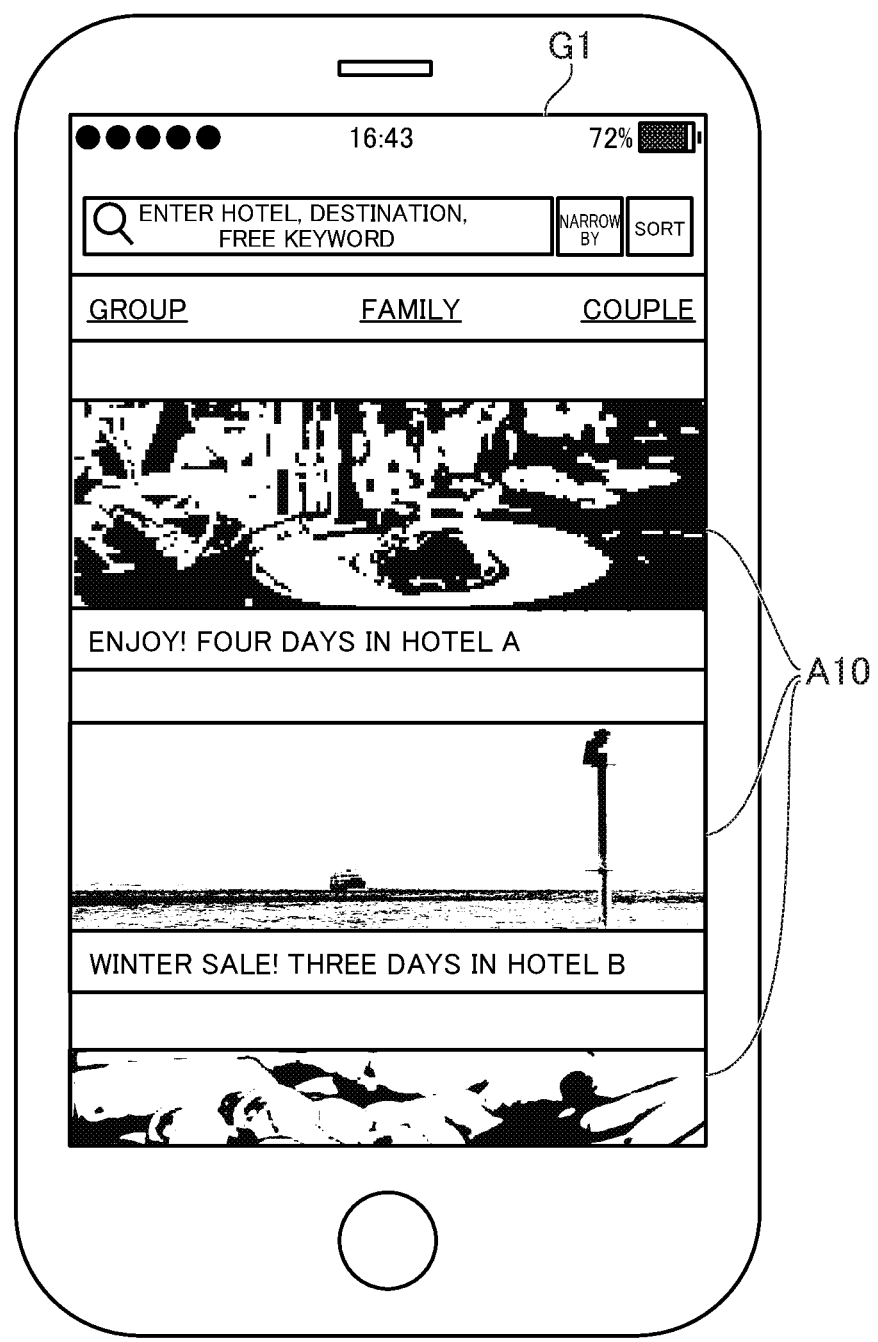
FIG. 3 is a diagram illustrating an example of an itinerary list.

FIG. 3 is a diagram illustrating an example of the itinerary list screen. As shown in FIG. 3, an itinerary list screen G1 displays a basic itinerary list prepared in advance. For example, the itinerary list screen G1 allows a user to search itineraries based on keywords, or to narrow down itineraries based on a predetermined narrowing-down condition.

For example, the itinerary list screen G1 includes a plurality of areas A10 used by a user to select an itinerary. Each of the areas A10 displays a name and an image of an itinerary, and the user can select an itinerary by tapping one of the areas A10. When the user taps one of the areas A10 to select on the itinerary list screen G1, an itinerary screen indicating an itinerary is displayed on the display unit 15.

Figure 4:
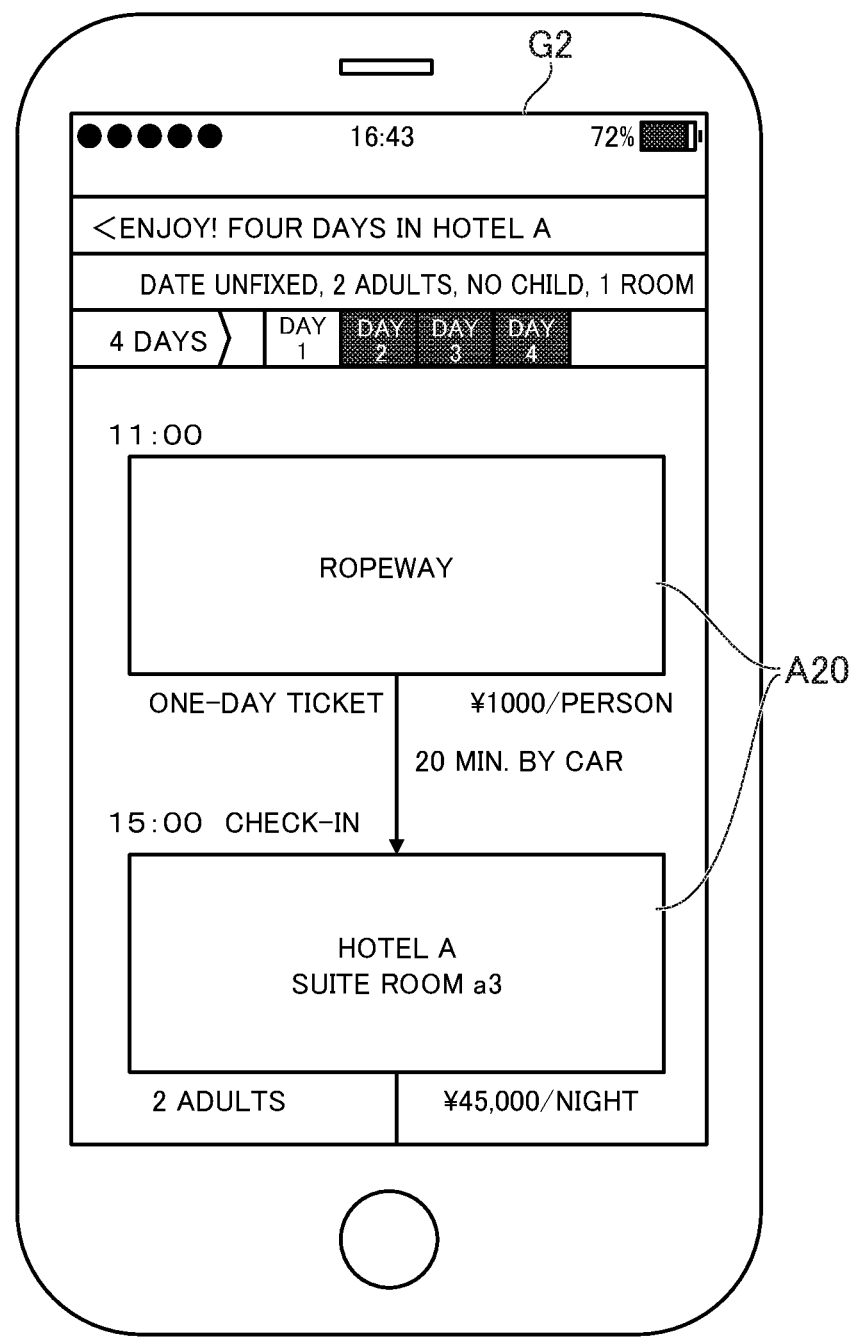
FIG. 4 is a diagram illustrating an example of an itinerary screen.

FIG. 4 is a diagram illustrating an example of the itinerary screen. As shown in FIG. 4, for example, an itinerary screen G2 displays an itinerary for each day. For example, the itinerary screen G2 displays areas A20 in which a sightseeing spot, an optional tour, a means of transportation, a hotel, and a restaurant each included in the itinerary are indicated in a time series. In the example of FIG. 4, the first day of the itinerary includes "visiting the mountain by the ropeway at 11:00, and then checking in hotel A at 15:00 to stay in suite room a3."

The user performs a predetermined operation on the itinerary screen G2 so that addition/deletion/change is made to the itinerary to create the user's preferred itinerary. As an example, here is explained an operation to change the room as needed while viewing information about the room of the hotel included in the itinerary. For example, in the itinerary screen G2, when the user taps the area A20 indicating "suite room a3" of "hotel A" included in the itinerary, a page of "suite room a3" is displayed on the itinerary screen G2.

Figure 5:
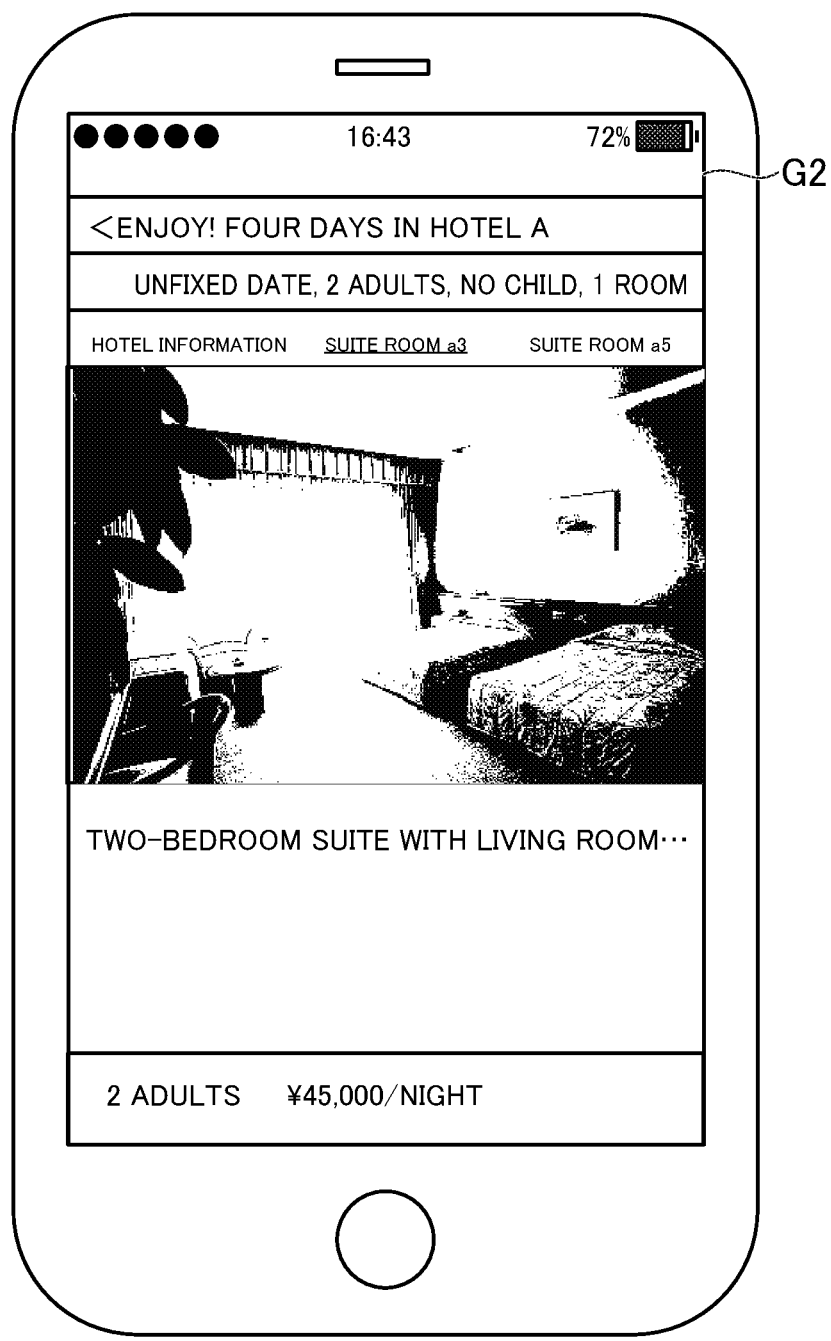
FIG. 5 is a diagram illustrating a page of room information item of a room tapped by a user.

FIG. 5 is a diagram showing a page of the room information of the room tapped by the user. As shown in FIG. 5, the itinerary screen G2 displays the page of the room information of the "suite room a3" tapped by the user, and indicates, for example, a room type, an interior image, description on the room, and a room rate.

In this embodiment, when the room information page of the room tapped by the user is displayed, the user swipes the screen horizontally, thereby moving to the hotel information page, or moving to a page of room information of other room in the same hotel. The room information page of the other room displays a button to include the room being displayed in the itinerary. When the user selects the button, the displayed room is replaced with the room already included in the itinerary. In the example of FIG. 5, the room already included in the itinerary is displayed, and thus such a button is not displayed. In this embodiment, the above described pages are arranged in the predetermined order.

Figure 6:
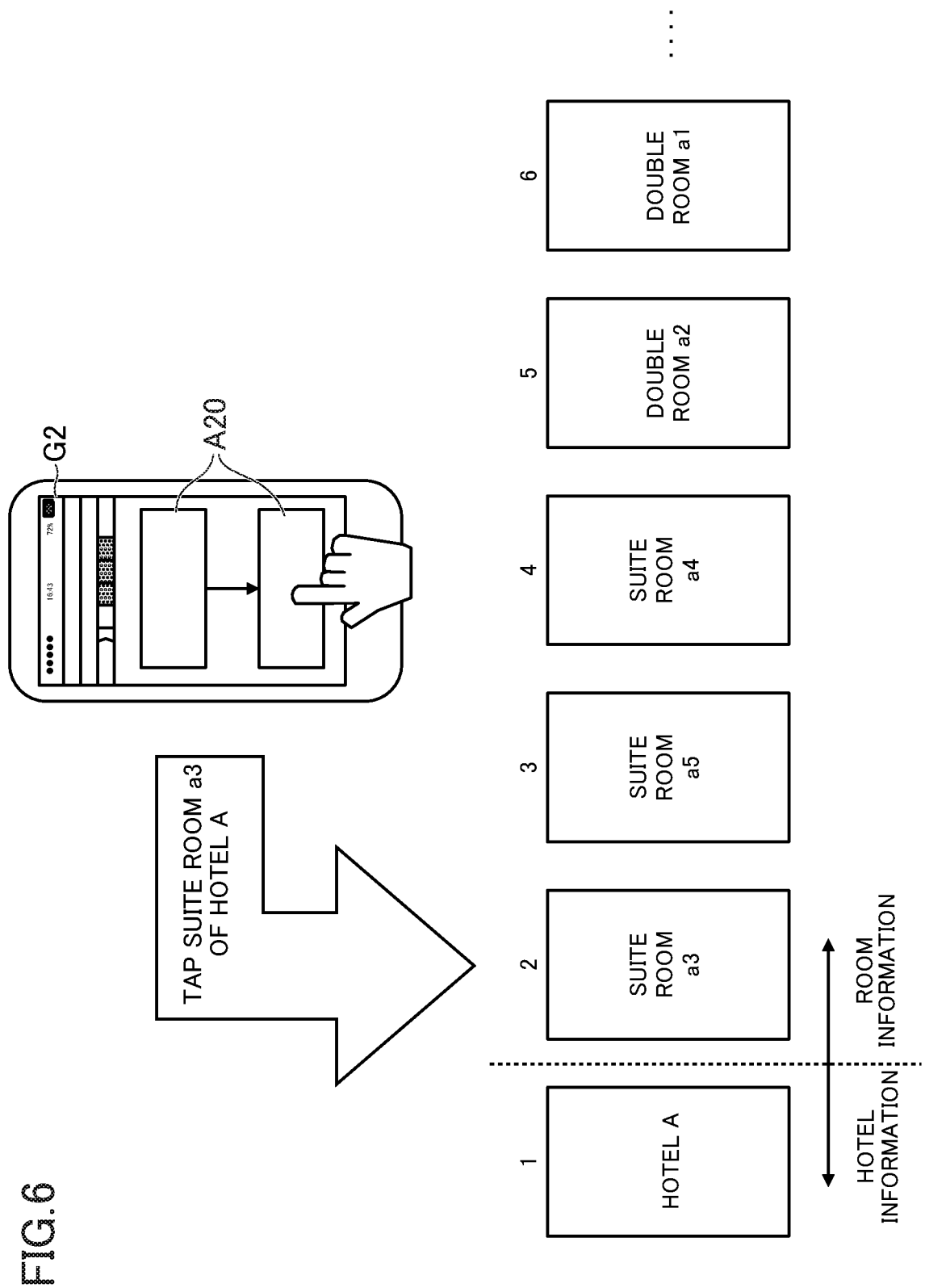
FIG. 6 is a diagram illustrating order of pages.

FIG. 6 is a diagram showing the order of pages. As shown in FIG. 6, when the user taps the area A20 indicating the "suite room a3" of "hotel A" included in the itinerary, "hotel A" having "suite room a3" is in the first page, and the tapped "suite room a3" is the second, and other rooms of "hotel A" are the third and the subsequent pages.

The order of pages of other rooms may be fixed in advance, although in this embodiment, rooms of the same type as the tapped "suite room a3" are listed in ascending order of rates. In the example of FIG. 6, "suite room a5" is the same type as the tapped "suite room a3", and has the lowest rate in the rooms of the same type, and thus positioned in the third. Further, "suite room a4" is the same type as the tapped "suite room a3", and has the second lowest rate in the rooms of the same type, and thus positioned in the fourth.

Further, "double room a2" is different from the tapped "suite room a3" in types but has the lowest rate in the rooms of the different types, and thus is positioned in the fifth. Further, "double room a1" is similar to the tapped "suite room a3" in types and has the second lowest rate in the rooms of the similar types, and thus positioned in the sixth. Similarly, from the seventh page and later, rooms different from the tapped room in types are arranged in ascending order of rates.

After the page of the tapped "suite room a3" is displayed on the itinerary screen G2, the user can move to other pages arranged in the above order by swiping the screen. In the following, to swipe a finger or a touch pen in the left direction is described as a left swipe, and to swipe in the right direction is described as a right swipe. For example, when a user performs the left swipe, the user can move to a page in the right side.

Figure 7:
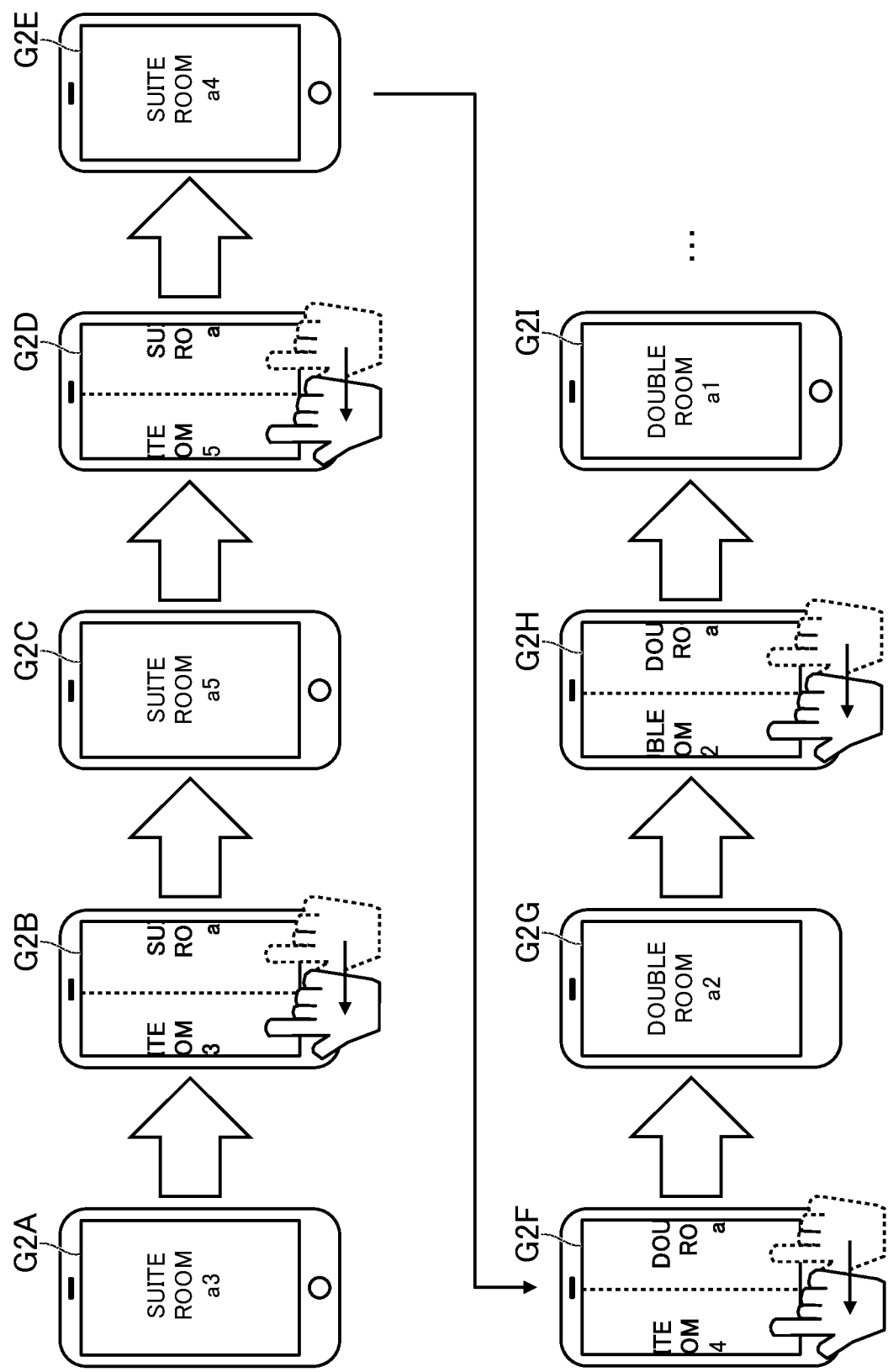
FIG. 7 is a diagram illustrating the itinerary screen changing when a user swipes left.

FIG. 7 is a diagram illustrating the itinerary screen G2 changing when the user swipes left. In FIG. 7, for simplicity, details of the itinerary screen G2 are omitted. FIG. 7 only shows which pages are displayed. As shown in FIG. 7, while the page of "suite room a3" is displayed (itinerary screen G2A), the user swipes left (itinerary screen G2B), thereby moving from the page of "suite room a3" being displayed to the page of "suite room a5" on the right side (itinerary screen G2C).

Subsequently, while the page of "suite room a5" is displayed (itinerary screen G2C), the user swipes left (itinerary screen G2D), thereby moving from the page of "suite room a5" being displayed to the page of "suite room a4" on the right side, and then the page of "suite room a4" is displayed (itinerary screen G2E). Similarly, each time the user swipes left, the user can move to a page on the right side (itinerary screens G2F to G2I). On the other hand, when the user swipes right, the user can move to a page on the left side.

Figure 8:
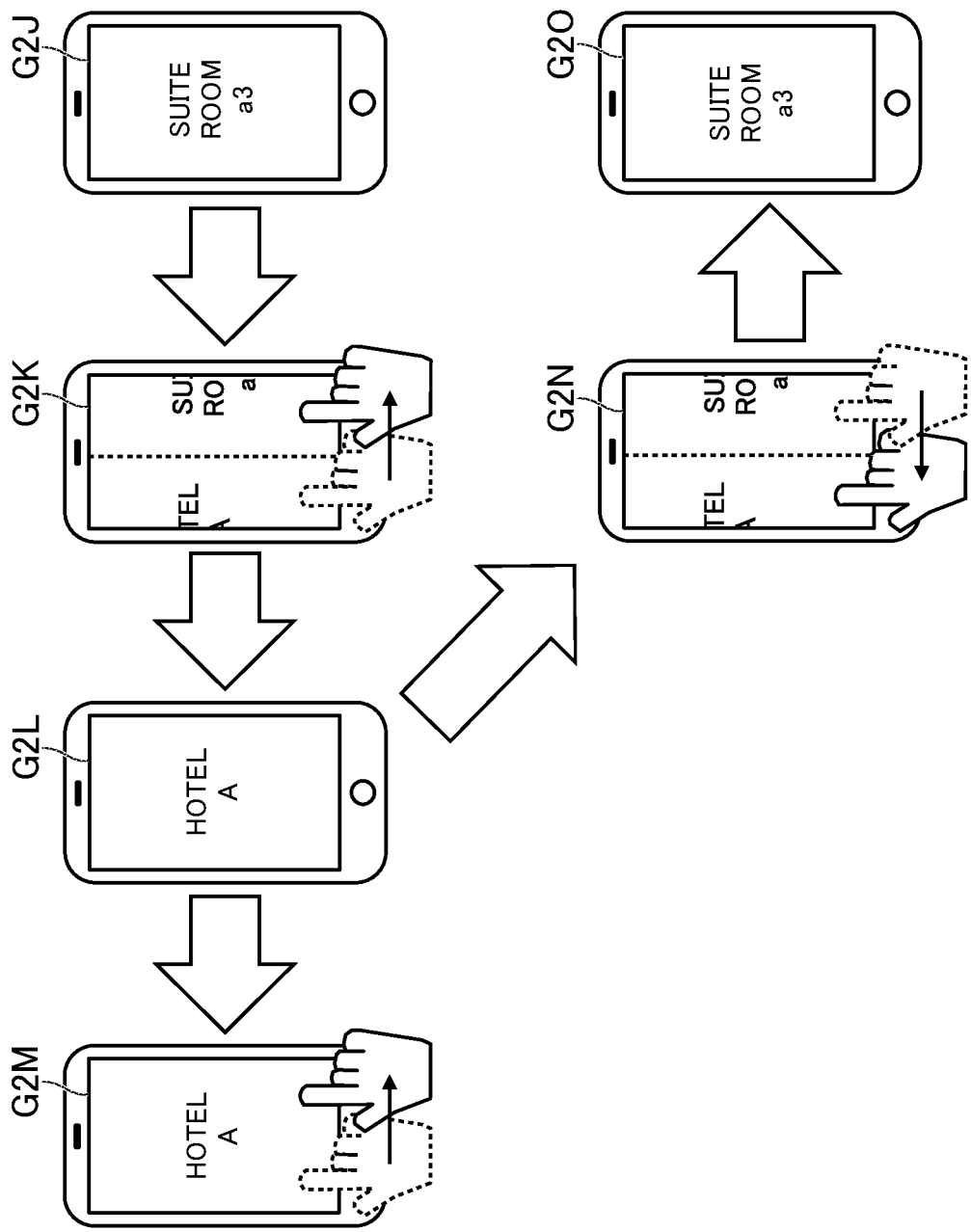
FIG. 8 is a diagram illustrating the itinerary screen changing when a user swipes right.

FIG. 8 is a diagram illustrating the itinerary screen G2 changing when the user swipes right. As shown in FIG. 8, while the tapped page of "suite room a3" is displayed (itinerary screen G2J), the user swipes right (itinerary screen G2K), thereby moving from the page of "suite room a3" to the page of "hotel A" on the left side (itinerary screen G2L).

In the example of FIG. 8, the page of "hotel A" is displayed first and there is no page on the left side. As such, if the user swipes right while the page of "hotel A" is displayed (itinerary screen G2L), the user does not move to another page (itinerary screen G2M). In this case, instead of not moving to another page, the user may move to the last page to loop, or go back to the itinerary screen G2 (before "suite room a3" is tapped) shown in FIG. 5, for example. In a case where a roll-type interface is employed, for example, a more user-friendly interface can be provided by looping through the pages in this way.

If the user swipes left (itinerary screen G2N) while the page of "hotel A" is displayed (itinerary screen G2L), the user returns to the page of "suite room a3" on the right side from the page of "hotel A" (itinerary screen G2O). In other words, if the right swipe and the left swipe are alternately repeated, the user can go back and forth between the page of "suite room a3" tapped first and the page of "hotel A."

In a case where the user returns to the page of "suite room a3" from the page of "hotel A" and then swipes left, as described in FIG. 7, the user can move to pages on the right side one after another each time swiping left. Further, in a case where the user moves to a page on the right side and then repeats the right swipe, the user can sequentially move to pages on the left side and then go back to the page of "suite room a3."

As described above, according to the display control system S in this embodiment, the page of the hotel having the tapped room, the page of the tapped room, and the pages of other rooms are arranged in this order on the itinerary screen G2. The user can move between pages by swiping the screen, which dynamically change the page order according to the tapped room, and thus the hotel information and other rooms' information are easy to see. This can reduce burden of operation on the user. In the following, details of this technique will be described.

1-3. Functions Implemented in Embodiment 1

Figure 9:
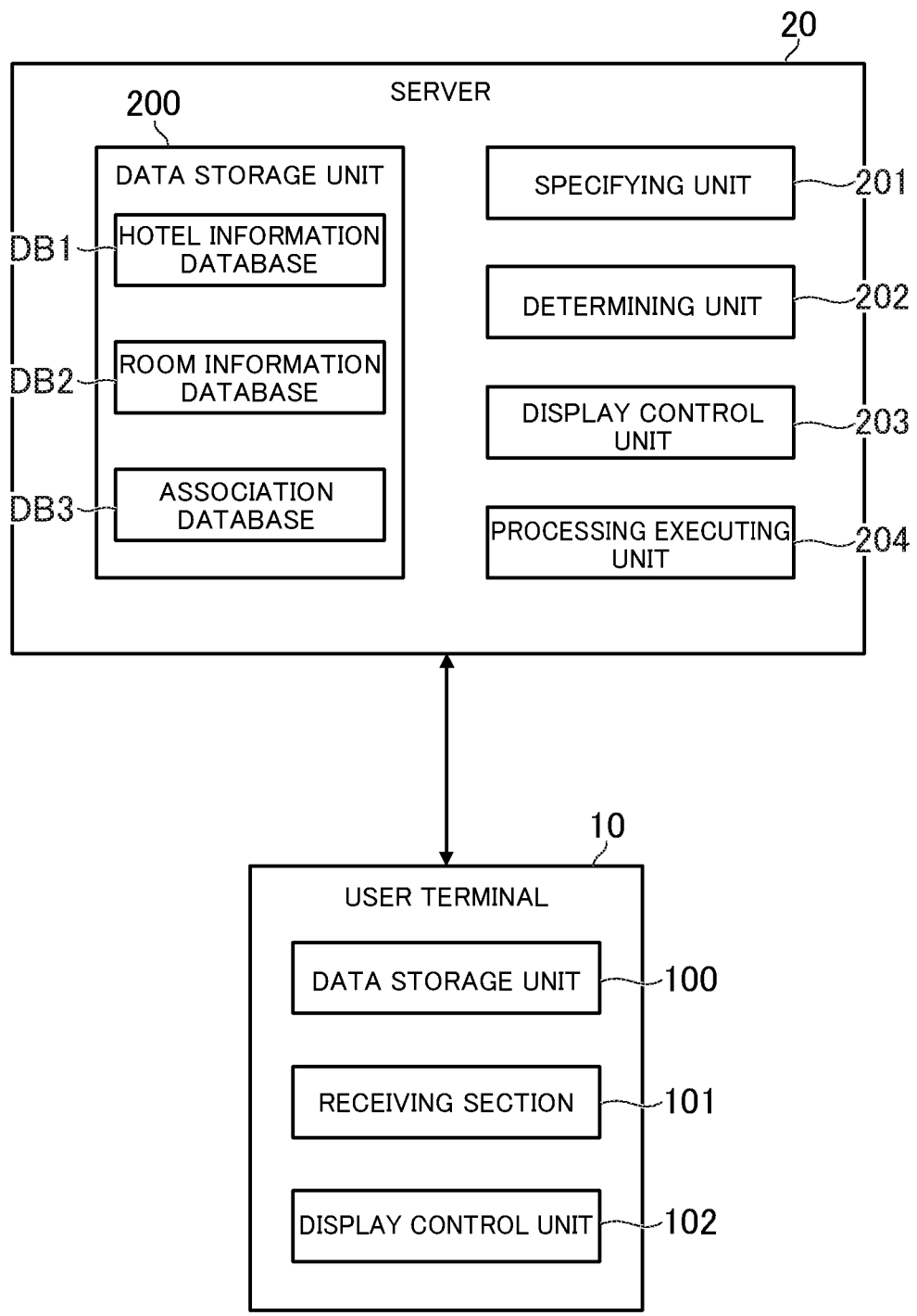
FIG. 9 is a functional block diagram showing an example of functions implemented in the display control system of Embodiment 1.

FIG. 9 is a functional block diagram showing an example of functions implemented in the display control system S of Embodiment 1. In this embodiment, a case will be described in which main functions relating to display control of pages are implemented in the server 20, although the main functions may be implemented in the user terminal 10 as in a variation described later, or the user terminal 10 and the server 20 may share the functions.

[1-3-1. Functions Implemented in Server]

As shown in FIG. 9, a data storage unit 200, a specifying unit 201, a determining unit 202, a display control unit 203, and a processing executing unit 204 are implemented in the server 20. The data storage unit 200, the specifying unit 201, the determining unit 202, the display control unit 203, and the processing executing unit 204 are examples of storing means, specifying means, determining means, display control means, and processing executing means, respectively.

[Data Storage Unit]

The data storage unit 200 is implemented mainly by the storage unit 22. The data storage unit 200 stores data necessary for display control of pages. Here, a hotel information database DB1, a room information database DB2, and an association database DB3 will be described as examples of data stored in the data storage unit 200.

In this embodiment, the data to be described as being stored in the data storage unit 200 of the server 20 may be stored in another server in the display control system S, or in other server outside the display control system S (e.g., a server in a system managed by partner companies such as an air company and a tour company). In this case, the server 20 and other servers can communicate with each other by exchanging APIs (Application Programming Interfaces) or files.

FIG. 10 is a diagram illustrating an example of data stored in the hotel information database DB1. As shown in FIG. 10, the hotel information database DB1 is a database for storing hotel information. For example, the hotel information database DB1 stores categories and types of data and actual data of hotel information in association with hotel IDs for uniquely identifying hotel information.

The categories of data are used for roughly classifying the data, and are information for identifying whether the data is hotel information or room information, for example. That is, the categories of data are used for conceptually identifying to which level of information the data belongs. Here, if a category of data is "provider", it means that the data is common information, and a category of data is "item", it means that the data is individual information. As such, if a category of data is "provider", such information conceptually belongs to the upper level, and if a category of data is "item", such information conceptually belongs to the lower level. The hotel information database DB1 stores hotel information, and thus categories of data stored in the hotel information database DB1 indicate all "provider."

The types of data indicate detailed classifications of data, and information for identifying, for example, any one of common information items, such as hotel information, restaurant information, and optional tour company information.

That is, a type of data is information for identifying a kind of common information item. For example, if a category of data is "provider", there are types "hotel", "restaurant", and "tour company." For example, a type of hotel information is "hotel", a type of restaurant information is "restaurant", and a type of optional tour company information is "tour company."

The actual data of hotel information indicates content of the hotel information, and is used for displaying pages of the hotel information. The actual data of hotel information stores texts and images to be displayed on pages of hotel information, and includes, for example, a hotel's name, address, contact information, building image, facilities in the property, equipment, rate ranges, and consumer reviews. The actual data of hotel information may include information about page layout of hotel information.

FIG. 11 is a diagram illustrating an example of data stored in the room information database DB2. As shown in FIG. 11, the room information database DB2 is a database for storing room information. For example, the room information database DB2 stores categories and types of data, and actual data of room information in association with room IDs for uniquely identifying room information.

The meaning of categories and types of data is as described above. For example, the room information database DB2 stores room information, and thus categories of data stored in the room information database DB2 all indicate "item." Further, for example, if a category of data is "item", there are types such as "room", "menu", and "tour detail." For example, a type of a room information item is "room", a type of a menu information item is "menu", and a type of an optional tour information item is "tour detail."

In this embodiment, for example, the hotel information item having a data class of "provider" and a type of "hotel" corresponds to the room information item having a data class of "item" and a type of "room." For example, the restaurant information item having a data class of "provider" and a type of "restaurant" corresponds to the menu information item having a data class of "item" and a type of "menu." For example, the provider company information item having a data class of "provider" and a type of "tour company" corresponds to the optional tour information item having a data class of "item" and a type of "tour detail." These correspondences may be defined in a numerical expression format or a table format, or defined as a part of a program code.

Categories are attributes (classifications) of room information, and include a suite room, a double room, and a single room, for example. The display control system S includes a plurality of categories, and each room is classified into one of categories.

The actual data of room information indicates content of room information, and is data for displaying pages of room information. The actual data of room information stores texts and images to be displayed on pages of room information, and includes, for example, room's name, capacity, layout, size, with or without bathroom, and a description on the room. The actual data of room information may include information about page layout of room information.

FIG. 12 is a diagram illustrating an example of data stored in the association database DB3. As shown in FIG. 12, the association database DB3 defines association between a hotel information item and a plurality of room information items. Associating hotel information items with room information items means enabling hotel information items and room information items to be mutually searchable.

In other words, the association database DB3 defines correspondence between hotel information items and room information items. For example, each hotel ID is associated with a plurality of room IDs in the association database DB3. In this embodiment, hotel IDs and room IDs have a one-to-many relationship.

Here, a case is described in which the association database DB3 defines association between hotel information items and room information items, although such association may be defined in the hotel information database DB1, or in the room information database DB2. In the case where the association is defined in the hotel information database DB1, a plurality of room IDs may be stored in association with a hotel ID. In a case where the association is defined in the room information database DB2, a hotel ID may be stored in association with a room ID. Alternatively, for example, association between hotel information items and room information items may be defined in any format, instead of a database format. For example, the association may be defined by data in a numerical expression format, or described as a part of a program code.

The data stored in the data storage unit 200 is not limited to the above examples. For example, the data storage unit 200 may store a database indicating predetermined basic itineraries. For example, the data storage unit 200 may store a database indicating itineraries arranged by users. For example, the data storage unit 200 may store image data of images to be displayed on the itinerary list screen G1 and the itinerary screen G2.

[Specifying Unit]

The specifying unit 201 is implemented mainly by the control unit 21. When one of room information items associated with each hotel information item is specified, the specifying unit 201 specifies a hotel information item associated with the specified room information item and the other room information items associated with the hotel information item.

Here, to specify includes to manually specify by a user and to automatically specify by a computer. That is, a room information item may be specified by an operation of the operation unit 14 by a user, or by an execution of a program by a computer.

For example, in a case where the user manually specifies a room information item, the user performs a predetermined specifying operation to specify the room information item. For example, the specifying operation is described as tapping an image indicating the room information item (e.g., area A20 in FIG. 4), although the specifying operation may be any operation to specify a room information item. For example, the specifying operation may be using the operation unit 14 to select an image indicating a room information item (e.g., pressing and holding the image on the touch panel, double-tapping the image by a mouse, or clicking the image), or selecting a link to the room information item.

For example, in a case where the computer automatically specifies a room information item, the computer specifies the room information item when it is determined that a predetermined condition is satisfied. The predetermined condition may be a freely determined condition, such as, displaying the room information item on the user terminal 10 for a predetermined period of time, or determining the room information item to recommend based on a browsing history of the user, for example.

For example, the specifying unit 201 specifies a room ID of the specified room information item based on the user's specifying operation or the specifying results of the computer. The specifying unit 201 then refers to the association database DB3 to specify a hotel ID associated with the specified room ID, thereby specifying a hotel information item. For example, the specifying unit 201 specifies the other room IDs associated with the specified hotel ID, thereby specifying the other room information items.

The other room information items indicate room information items other than the specified room information among the plurality of room information items associated with the hotel information item specified by the specifying unit 201. That is, the other room information items are room information items of the other rooms in the same hotel that has the room of the specified room information item.

The other room information items specified by the specifying unit 201 may include an information item or a plurality of information items. For example, if a hotel has only two types of rooms and two room information items, the number of the other room information items specified by the specifying unit 201 is necessarily one.

If three or more room information items are associated with a hotel information item, the specifying unit 201 may specify a plurality of other room information items. In this case, there are two or more other room information items, and the specifying unit 201 may specify all of the other information items, or only a part of the other information items. That is, for example, if a hotel has ten room types and ten room information items, the number of the other room information items that the specifying unit 201 can specify is nine. The specifying unit 201 may specify all of these nine other room information items, or only some of the other room information items. In a case where only some of the other room information items are specified, the specifying unit 201 may only specify the rooms that are similar in categories or rates to the tapped room information item.

[Determining Unit]

The determining unit 202 is implemented mainly by the control unit 21. The determining unit 202 determines the order of a room information item specified by a tap, a hotel information item, and the other room information items such that the room information item specified by the tap is inserted between the hotel information item and the other room information items. An algorithm for determining the order is defined in the program in advance, and the determining unit 202 determines the order based on the algorithm.

As described above, the room information item may be specified by a user or a computer. As such, in this embodiment, "room information item specified by a tap" can be replaced by "specified room information item", and such a room information item may be specified by a user or by a computer.

For example, the determining unit 202 may determine the order such that the hotel information item is positioned immediately before the room information item specified by the tap, and the other room information items are positioned after the room information item specified by the tap. On the contrary, for example, the determining unit 202 may determine the order such that the hotel information item is positioned immediately after the room information item specified by the tap, and the other room information items are positioned before the room information item specified by the tap.

For example, the determining unit 202 may determine the order of the other room information items based on the room information item specified by the tap. In this embodiment, each room information item is associated with a category, and thus, the determining unit 202 determines the order of the other room information items based on the category of the room information item specified by the tap and categories of the other room information items.

For example, the determining unit 202 determines the order of the other room information items such that the other room information items in the same category as the room information item specified by the tap are positioned next to the room information item specified by the tap. For example, the determining unit 202 determines the order of the other room information items such that, when a room information item in the other room information items is positioned closer to the room information item specified by the tap, such a room information item is more similar in categories to the room information item specified by the tap. In other words, the determining unit 202 determines the order of the other room information items such that the other room information items are arranged in order of similarity of categories from the room information item specified by the tap.

The data for defining similarity/dissimilarity between the categories may be defined in the data storage unit 200 in advance. The data may be in a numerical expression format or a table format, or a part of a program code. For example, according to such data, "double room" is defined as a category similar to "suite room", and "single room" is defined as a category dissimilar to "suite room." The determining unit 202 determines a category similar to a room information item specified by a tap based on the data, and determines the order of the other room information items such that the other room information items in the determined category are positioned closer to the room information item specified by the tap.

The method of determining the order of the other room information items based on the room information item specified by a tap is not limited to the method using categories. For example, the determining unit 202 may determine the order of the other room information items based on the rate of the room of the room information item specified by the tap. In this case, the determining unit 202 may determine the order of the other room information items in ascending order of the difference in rates from the room information item specified by the tap.

For example, the determining unit 202 may determine the order of the other room information items based on keywords included in the room information item specified by the tap. In this case, the determining unit 202 may determine the order of the other room information items such that the other room information items are arranged in descending order of the matched number of keywords included in the other room information items with the keywords included in the room information item specified by the tap. Alternatively, for example, the determining unit 202 may determine the order of the other room information items based on a capacity, a layout, and a size of the room included in the room information item specified by the tap.

[Display Control Unit]

The display control unit 203 is implemented mainly by the control unit 21. The display control unit 203 displays a page of the room information item specified by a tap on the display unit 15. That is, when one of the room information items is tapped and specified, the display control unit 203 displays a page of the specified room information item on the display unit 15. In other words, in response to a tap on a room information item (i.e., a room information item is specified), the display control unit 203 displays the page of the room information item on the display unit 15.

In this embodiment, the server 20 mainly performs display control. As such, the display control unit 203 acquires a room information item specified by a tap from the room information database DB2, generates display data of a page of the specified room information item based on the room information item, and sends the generated data to the user terminal 10, thereby displaying a page of the room information item on the display unit 15.

When a page turning operation is performed in a predetermined direction while the page of the room information item specified by the tap is displayed, the display control unit 203 displays pages of the other room information items. When a page turning operation is performed in a direction contrary to the predetermined direction while the page of the room information item specified by the tap is displayed, the display control unit 203 displays a page of a hotel information item.

The page turning operation is an operation to turn pages back and forth, for example, and is a direction instruction operation performed by the operation unit 14. In other words, the page turning operation can be described as an operation to change the current page to another page, or to switch pages.

In this embodiment, the operation to change a touch position on the touch panel is described as an example of the page turning operation, and further, a swiping action is described as a specific example. As such, in this embodiment, swiping can be replaced with a page turning operation.

The predetermined direction is a direction to which a page is turned backward or forward, and, for example, one of upper, lower, left, and right directions indicated on the screen. Here, upper, lower, left, and right indicate upper, lower, left, and right directions of the user terminal 10 (display unit 15) viewed from a user who stands straight. In other words, in a case of a vertically long screen, a long-side direction is an upper-lower direction (vertical direction), and a short-side direction is a left-right direction (horizontal direction). On the other hand, in a case of a horizontally long screen, a short-side direction is an upper-lower direction, and a long-side direction is a left-right direction.

If the predetermined direction is a page forward direction, an opposite direction is a page backward direction. If the predetermined direction is a page backward direction, an opposite direction is a page forward direction. For example, the opposite direction is a direction having a predetermined angle or more with the predetermined direction on the screen, and a direction opposite to the predetermined direction. For example, the opposite direction may be at an angle of 180 degrees with respect to the predetermined direction, and may not need to be exactly the opposite to the predetermined direction. The opposite direction may be at any angle of more than 90 degrees and less than 180 degrees.

In this embodiment, the left direction (page forward direction) corresponds to the predetermined direction, and a case will be described as an example in which the page turning operation in the predetermined direction is a left swipe. Further, the right direction (page backward direction) corresponds to the opposite direction, and a case will be described as an example in which the page turning operation in the opposite direction is a right swipe. As such, in this embodiment, a left swipe can be replaced with a page turning operation in the predetermined direction, and a right swipe can be replaced with a page turning operation in the opposite direction.

In this embodiment, as shown in FIG. 6, the page number increases to the right, and thus the left swipe is a page forward operation and the right swipe is a page backward operation. However, when the page number increases to the left, the right swipe may be a page forward operation, and the left swipe may be a page backward operation.

Any operation may be applied to the page turning operation, such as a flick on the touch panel, or selecting an arrow image indicating a page turning direction. In a case of using arrow images, an arrow image indicating the predetermined direction and an arrow image indicating the opposite direction may be used to specify a direction designated by a user.

For example, if the user terminal 10 includes a microphone, the page turning operation may be indicated by speech. For example, if the user terminal 10 includes a camera, the page turning operation may be indicated by a user's gesture. For example, if the user terminal 10 includes an acceleration sensor and a gyro sensor, the page turning operation may be indicated by changes in a position or a posture of the user terminal 10.

For example, when the user swipes the user terminal 10, the server 20 is notified of the swipe operation by the user terminal 10. The notification includes the direction of the swipe. When the server 20 receives the notification, the display control unit 203 specifies a direction of the swipe based on the received notification. The display control unit 203 specifies a page that should be displayed based on the swipe direction and the order determined by the determining unit 202. In this regard, information for identifying the order of the page being displayed is stored in the data storage unit 200 in advance. The display control unit 203 generates display data of the specified page based on the hotel information database DB1 or the room information database DB2, and sends the generated data to the user terminal 10.

More specifically, for example, when the user swipes left on a page being displayed, the user terminal 10 notifies the server 20 of the left swipe. When the server 20 receives the notification, the display control unit 20 generates display data of a following page based on the information for identifying the page being displayed and the order determined by the determining unit 202, and sends the generated data to the user terminal 10. Similarly, when the user swipes right on a page being displayed, the user terminal 10 notifies the server 20 of the right swipe. When the server 20 receives the notification, the display control unit 203 generates display data of a preceding page based on the information for identifying the page being displayed and the order determined by the determining unit 202, and sends the generated data to the user terminal 10.

When the user swipes the user terminal 10, the server 20 may not specify a subsequent page, but the determination result (e.g., the order of hotel IDs and room IDs) of the determining unit 202 may be sent to the user terminal 10 in advance so that the user terminal 10 may specify a subsequent page. In this case, the user terminal 10 sends a hotel ID or a room ID to be displayed as a subsequent page to the server 20. When the server 20 receives the hotel ID or the room ID, the display control unit 203 generates a page corresponding to the received hotel ID or room ID, and sends the generated page to the user terminal 10. In this case, information for identifying the order of the page being displayed is stored in the data storage unit 100 of the user terminal 10 in advance.

For example, in a case where a program (e.g., travel reservation application) stored in the user terminal 10 includes frames of pages, the display control unit 102 of the user terminal 10 may acquire images and text information in the pages from the server 20, and insert the acquired images and text information in the frames. The frames are data that defines a basic layout of pages, and the pages are completed when the images and the text information are placed at predetermined positions in the frames. As such, the pages may be generated in the user terminal 10 instead of the server 20. A page of a hotel information item (a page having a data class of "provider" and a type of "hotel") and a page of a room information item (a page having a data class of "item" and a type of "room") may use the same frame, or use different frames.

For example, when one of the areas A20 on the itinerary screen G2 is tapped (i.e., one of items is selected), an item name (e.g., room name) and a provider name (e.g., hotel name) may be extracted, and a list indicating the order determined by the determining unit 202 may be generated and sent to the user terminal 10 together with page information of the item indicated by the tapped area A20. As shown in FIG. 5, the list is sent and thus previous and subsequent item names can be displayed on the upper part of the page, for example.

The room information item may also be described as information inserted into the frames of the pages. The target of the determining unit 202 to determine the order may be the room information item itself, although in this embodiment, a case will be explained in which the target is room names or room IDs. That is, the target to be determined may not be the order of information items inserted into the frames of the pages, but the order of room names or room IDs that can identify the information items may be the target to be determined.

In this embodiment, each hotel information item is associated with three or more room information items. As described above by referring to FIG. 7, while the page of the room information item specified by the tap is displayed, the display control unit 203 sequentially displays pages of the other room information items each time the left swipe is performed. That is, the display control unit 203 displays pages of the other room information items one after another in a case where the left swipe is repeatedly performed.

For example, as described above by referring to FIG. 8, when the left swipe is performed while the page of the hotel information item is displayed, the display control unit 203 displays again the page of the room information item specified by the tap. When the left swipe is performed after the right swipe is performed and the page of hotel information item is displayed, the display control unit 203 returns to the page of room information item specified by the tap.

In the case where each hotel information item is associated with three or more room information items as in this embodiment, the display control unit 203 may display some of the other room information items based on the room information item specified by the tap. That is, the display control unit 203 may display room information items of only some of the rooms instead of displaying the room information items of all of the other rooms of the hotel to which the room specified by the tap belongs. In this case, some of the rooms may indicate rooms of a type that is the same as or similar to the tapped room, or rooms that are different from the tapped room by less than threshold values in a room rate, the number of people that can stay, a layout, and a size.

[Processing Executing Unit]

The processing executing unit 204 is implemented mainly by the control unit 21. When a user performs a specifying operation while one of pages of the room information items is displayed on the display unit 15, the processing executing unit 204 executes predetermined processing based on the specified room information item.

Here, the specifying operation is an operation performed by a user, and as an example, an operation (e.g., tapping on a touch panel or clicking by a mouse) to select a predetermined image (e.g., button) on a page will be described. The specifying operation may be other operations, such as pressing and holding or double-tapping the touch panel, or indicating by speech, gesture, or changes in a position or a posture of the user terminal 10 similarly to the page turning operation.

The predetermined processing may be any predetermined processing, such as processing for determining room information of a page being displayed as room information specified by a user. As such, the room information item may be described as an information item that is specified by a user, and the hotel information item may be described as an information item to which the user refers to specify a room information item.

For example, the predetermined processing may be processing for determining, instead of a room information item that is tapped first, a room information item displayed on a page as a room information item specified by a user. The processing executing unit 204 executes the predetermined processing based on the specifying operation by the user, and the pages on the itinerary screen G2 thereby serve as user interfaces for exchanging information between the user and the user terminal 10 instead of merely presenting information. This provides more technical features.

[1-3-2. Functions Implemented in User Terminal]

As shown in FIG. 9, the data storage unit 100, the receiving section 101, and the display control unit 102 are implemented in the user terminal 10. The data storage unit 100, the receiving section 101, and the display control unit 102 are respectively the examples of storing means, receiving means, and display control means.

[Data Storage Unit]

The data storage unit 100 is implemented mainly by the storage unit 12. The data storage unit 100 stores data received from the server 20. For example, the data storage unit 100 stores data for displaying pages of room information items or hotel information items received from the server 20. Alternatively, for example, the data storage unit 100 may store display data of the itinerary list screen G1, or the itinerary screen G2.

[Receiving Section]

The receiving section 101 is implemented mainly by the control unit 11. The receiving section 101 receives an operation of a user based on a detection signal from the operation unit 14. When the receiving section 101 receives an operation of the user, the user terminal 10 sends information indicating content of the operation to the server 20. For example, when the receiving section 101 receives a tap, a right swipe, or a left swipe, the user terminal 10 sends information for identifying which operation is performed to the server 20.

[Display Control Unit]

The display control unit 102 is implemented mainly by the control unit 11. The display control unit 102 displays various types of screens based on display data received from the server 20. For example, the display control unit 102 displays pages of room information items or hotel information items on the display unit 15. In addition, for example, the display control unit 102 displays the itinerary list screen G1 and the itinerary screen G2. As described above, if a program (e.g., travel reservation application) of the user terminal 10 includes frames of pages, the display control unit 102 of the user terminal 10 may acquire room information items and hotel information items from the server 20, and generate pages by inserting images and text information into the frames.

1-4. Processing Executed in this Embodiment

Figure 13:
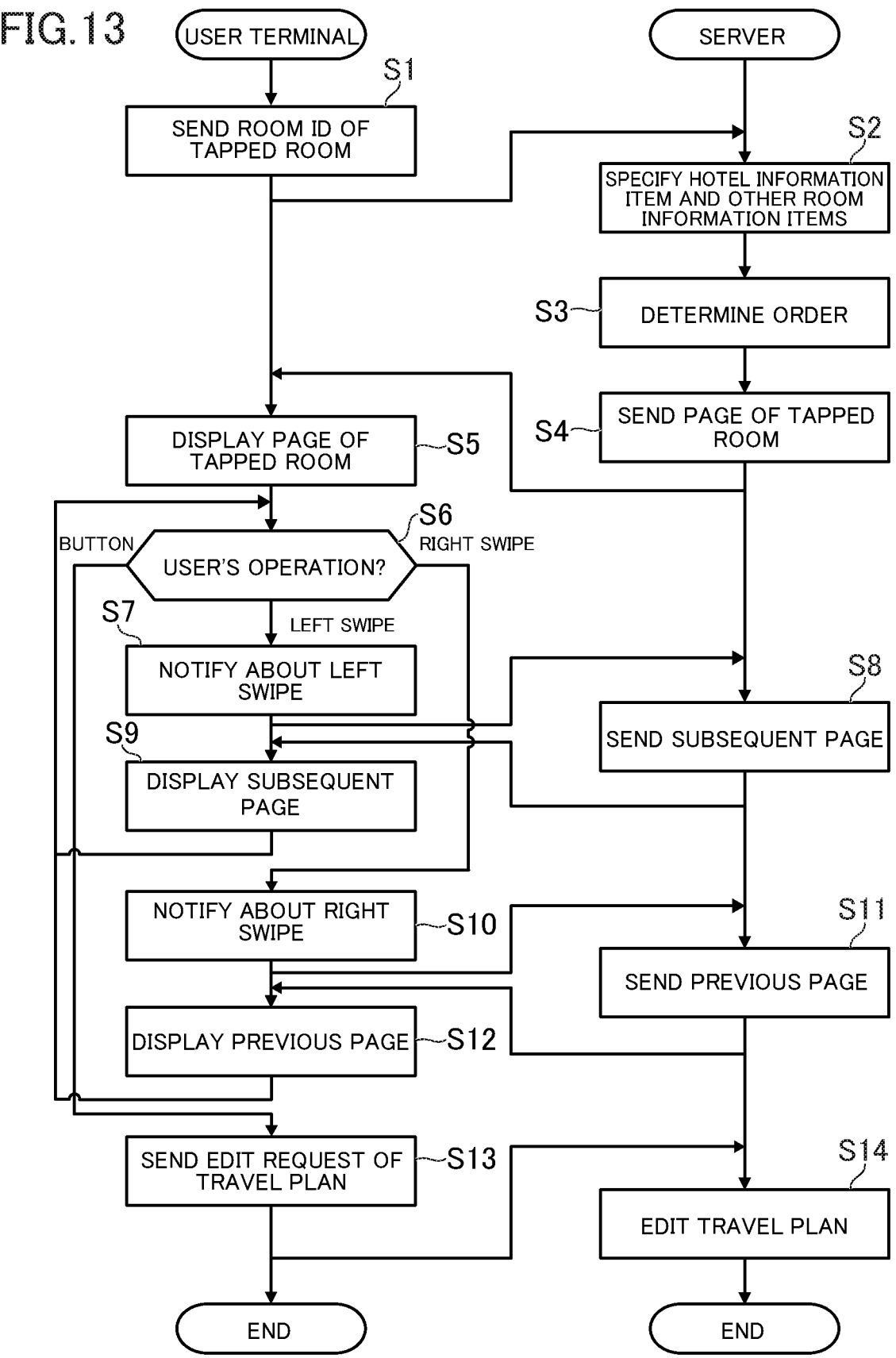
FIG. 13 is a flow chart showing an example of processing executed in the display control system.

FIG. 13 is a flow chart showing an example of processing executed in the display control system S. The processing shown in FIG. 13 is executed when the control units 11 and 21 respectively operate in accordance with programs stored in the storage units 12 and 22. The processing described below is an example of the processing executed by the functional block shown in FIG. 9. Here, the processing will be described in a case where the user taps the area A20 indicating the room of the hotel included in the itinerary on the itinerary screen G2 shown in FIG. 4.

As shown in FIG. 13, the control unit 11 of the user terminal 10 sends, to the server 20, a room ID of the room indicated by the area A20 tapped on the itinerary screen G2 (S1). Upon displaying the itinerary screen G2, the user terminal 10 receives display data of the itinerary screen G2 from the server 20, and the display data includes the room ID of the room indicated by the area A20. In S1, the control unit 11 refers to the display data to acquire the room ID associated with the area A20 tapped by the user, and sends the acquired room ID.

When the server 20 receives the room ID, the control unit 21 specifies a hotel information item associated with the room information item specified by the tap and other room information items associated with the hotel information item based on the association database DB3 (S2). In S2, the control unit 21 refers to the association database DB3 to specify the hotel ID associated with the received room. ID. The control unit 21 specifies the room ID other than the room ID received in S2 among the room IDs associated with the specified hotel ID.

The control unit 21 determines the order of the information items such that the room information item specified by the tap is positioned between the hotel information item specified in S2 and the other room information items (S3). In S3, the control unit 21 determines the order such that the hotel ID specified in S2 is positioned first, the room ID received in S2 is positioned second, and the other room IDs specified in S2 are positioned third or later. The data indicating the order determined in S3 is stored in the storage unit 22.

In S3, the control unit 21 may refer to the room information database DB2 to acquire a category of the room ID received in S2 and categories of the other room IDs specified in S2, and determine the order of the other room IDs acquired in S2 such that the other room IDs having the same or similar category to that of the room ID received in S2 are positioned earlier in the order. Further, the control unit 21 may refer to the room information items of the other room IDs specified in S2 and determine the order from the lowest rate to the highest rate.

The control unit 21 generates and sends display data of a page of the tapped room (S4). In S4, the control unit 21 refers to the room information database DB2 and generates the display data based on the room information item associated with the room ID received in S2. Here, communication occurs between the server 20 and the user terminal 10 each time the user taps and swipes the user terminal 10, although communication may not need to occur each time the tap or the swipe is performed. For example, pages of the hotel information items and the room information items may be sent together from the server 20 to the user terminal 10 so that the pages of the room information items are displayed without the need of communication in response to a tap of the user, or the user may move to another page in response to a swipe of the user. In this case, if the user tires to move to another page by exceeding the range of pages received by the user terminal 10, the server 20 may additionally send the destination page to the user terminal 10.

When the user terminal 10 receives display data, the control unit 11 displays a page of the tapped room on the itinerary screen G2 based on the received display data (S5). The control unit 11 specifies the user's operation based on a detection signal from the operation unit 14 (S6). Here, one of a left swipe, a right swipe, and a selection of a button for including the room being displayed into the itinerary is performed. As described above, in this embodiment, if a page of the room that is already included in the itinerary is displayed, a button is not displayed.

When it is determined that a left swipe is performed (S6; left swipe), the control unit 11 notifies the server 20 of the left swipe (S7). In this regard, data indicating the determined order may be sent to the user terminal 10 in S3 so that the user terminal 10 can specify the page being displayed. In this case, if the page being displayed is the last page, it is not possible to proceed further, and thus the control unit 11 may not perform the processing in S7, and return to S6.

When the server 20 receives a notification that a left swipe is performed, the control unit 21 specifies the subsequent page (page on the right side) based on the order determined in S3, and generates and sends display data of the page (S8). In S8, the control unit 21 refers to the room information database DB2, and generates and sends display data of the subsequent page.

When the user terminal 10 receives the display data, the control unit 11 displays the subsequent page (page on the right side) on the itinerary screen G2 based on the received display data (S9), and returns to the processing in S6. After this, when the user repeats a left swipe again, the processing S7 to S9 is executed repeatedly, and pages of the room information items are sequentially displayed.

On the other hand, when it is determined that a right swipe is performed in S6 (S7; right swipe), the control unit 11 sends information that the right swipe has been performed to the server 20 (S10). Similarly to S7, if the page being displayed is the first page, it is not possible to go back, and thus the control unit 11 may return to S6 instead of executing processing of S10.

When the server 20 receives a notification that the right swipe is performed, in response to the received notification, the control unit 21 specifies the previous page (page on the left side) based on the order determined in S3, and generates and sends display data of the page (S11). In S11, the control unit 21 refers to the hotel information database DB1 or the room information database DB2, and generates and sends display data of the previous page.

When the user terminal 10 receives the display data, the control unit 11 displays the previous page (page on the left side) on the itinerary screen G2 based on the received display data (S12), and returns to the processing in S6.

In S6, if it is determined that the button is selected (S7; button), the control unit 11 sends an edit request of the itinerary to the server 20 (S13). The edit request may be made by sending data in a predetermined format, and include, for example, a room ID of the page being displayed. In this case, the display data sent in S4, S8, or S11 may include a room ID of the page. In S13, the control unit 11 refers to the display data to acquire and send a room ID of the page on which the user selects the button.

When the server 20 receives the edit request, the control unit 21 executes the processing for editing the itinerary (S13), and the processing terminates. In S13, the control unit 21 executes the processing for including the room being displayed when the button is selected in the itinerary instead of including the room first tapped by the user.

According to the display control system S described above, the page of the room information item specified by the tap is positioned between the page of hotel information item and the pages of other room information items. This enables the user to easily move to any page, and reduces the burden of operation on the user. For example, in a case where the order of pages is fixed as in a conventional electronic pamphlet, the page turning operation may need to be performed several tens of times in order to move from the page of the room information item being displayed to the page of the hotel information item. In the display control system S, the page order is dynamically determined in accordance with a room information item specified by a tap, and thus, it is possible to move to a page of a hotel information item or a page of other room information items with one swipe, for example. Further, in the conventional electronic pamphlet, display control processing for pages that users need not see is executed each time the page turning operation is performed, and thus the processing load on the user terminal 10 or the server 20 tends to increase. The display control system S eliminates the need for executing such unnecessary display control processing, and thereby reducing the processing load on the user terminal 10 and the server 20.

In the case where a hotel information item is associated with three or more room information items, pages of the room information items can be sequentially displayed by repeating the left swipe, and thus the burden of operation on users can be effectively reduced.

The order of the other room information items is determined based on the room information item specified by the tap, and thus the pages of other room information items having similar conditions can be positioned close together, and thus the number of operations required to reach the desired page can be reduced. As such, the burden of operation on users can be effectively reduced.

The order of the other room information items is determined based on a category of the room information item specified by the tap, and thus the pages of other room information items having the same or similar category can be positioned close together, and thus the number of operations required to reach the desired page can be reduced. As such, the burden of operation on users can be effectively reduced.

When the page of the hotel information item is displayed and the left swipe is performed, the user can return to the room information item specified by the tap. As such, after reviewing the hotel information item, the user can immediately return to the original page.

In a case where there are many other room information items, many of them are not desired room information. As such, when only some of the other room information items are to be displayed, it is possible to prevent unnecessary pages from being displayed.

The predetermined processing is executed based on the room information item specified by the user while pages of the room information items are displayed, and thus each page can function as a user interface.

The individual information is information relating to commercial items or services, and the common information is information relating their providers. This enables the information relating to commercial items or services to be readily viewed, and the information relating to the providers to be readily viewed.

The page turning operation is performed by a swipe action, which allows users to perform intuitive manipulation and reduces the burden of operation on the users.

1-5. Variation of Embodiment 1

The invention according to Embodiment 1 is not to be limited to the above described embodiment, and can be changed as appropriate without departing from the spirit of the present invention.

(1) For example, in Embodiment 1, as shown in FIG. 6, "hotel A" is the first page and there is no page on the left side of "hotel A", although pages of other hotels may be positioned on the left side of "hotel A", and displayed as the user repeats the right swipe.

Figure 14:
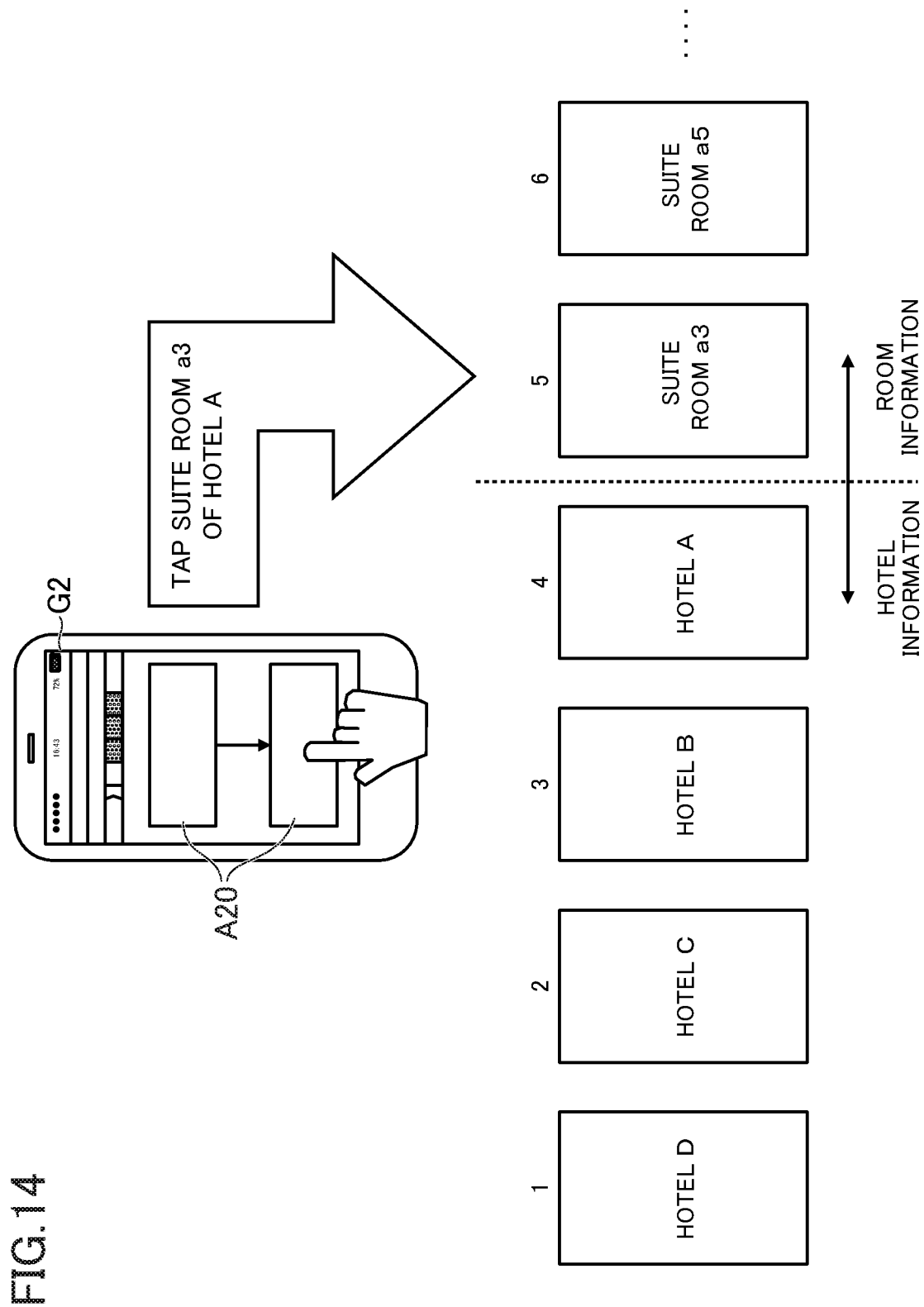
FIG. 14 is a diagram illustrating order of pages in Variation (1)

FIG. 14 is a diagram illustrating the order of pages in Variation (1). Here, similarly to Embodiment 1, a case will be described in which a user taps an area A20 of a room "suite room a3" of "hotel A" on the itinerary screen G2. As shown in FIG. 14, the relative order of the page of "hotel A" and the pages of the other rooms in "hotel A" is the same as Embodiment 1.

In Variation (1), however, "hotel A" is not the first page, but pages of other hotels "hotel B", "hotel C", and "hotel D" are positioned before "hotel A." As such, when the user swipes right while the page of "hotel A" is displayed, the pages of these hotels are displayed.

Figure 15:
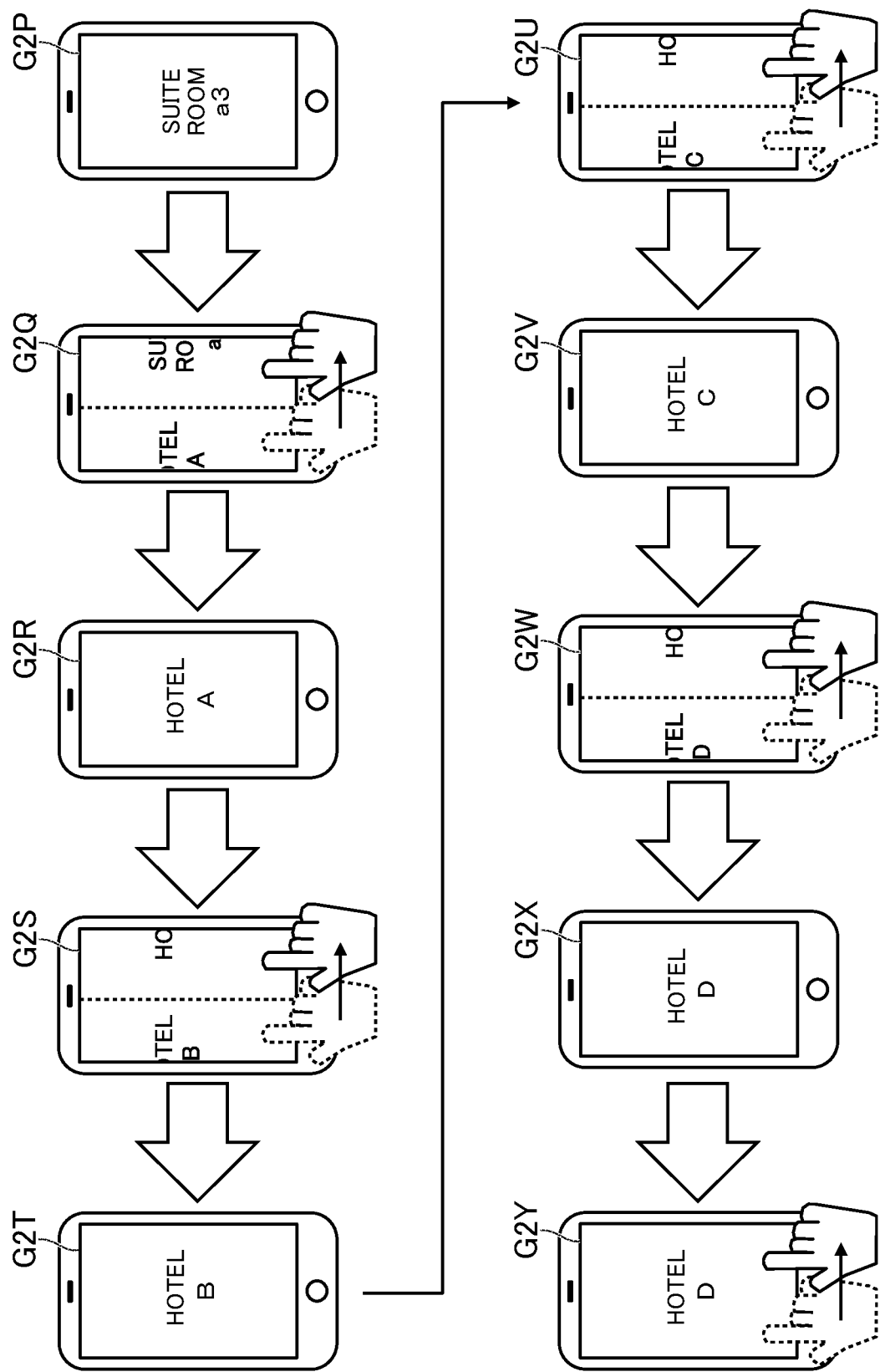
FIG. 15 is a diagram illustrating the itinerary screen changing when a user swipes right.

FIG. 15 is a diagram illustrating changes in the itinerary screen G2 when the user swipes right. As shown in FIG. 15, when the user swipes right (itinerary screen G2Q) while the tapped page of "suite room a3" is displayed (itinerary screen G2P), the page of "suite room a3" is switched to the page of "hotel A" on the left side (itinerary screen G2R).

Subsequently, when the user swipes right (itinerary screen G2S) while the page of "hotel A" is displayed (itinerary screen G2R), the page of "hotel A" is switched to the page of "hotel B" on the left side (itinerary screen G2T). Similarly, in the following, each time the user swipes right, the user can sequentially move to pages on the left side (itinerary screens G2U to G2X). As will be described in more detail in Embodiment 4, when the user taps one of the pages of "hotel B", "hotel C", and "hotel D" while the pages of these hotels are displayed, a room of the hotel of the tapped page may be booked.

The page of "hotel D" is the first page and there is no page on the left side. As such, when the user swipes right while the page of "hotel D" is displayed (itinerary screen G2X), the user does not move to other page (itinerary screen G2Y). In this regard, however, in a case where a roll-type user interface is employed, when the user swipes right while the page of "hotel D" is displayed (itinerary screen G2X), the user may move to the last page to loop. Further, when the user swipes left while a page of "hotel B", "hotel C" or "hotel D" is displayed (itinerary screens G2T, G2V, G2X), the page being displayed is switched to the page of the hotel information on the right side. That is, in a case where the right swipe is repeated while the page of "hotel A" is displayed, and then the left swipe is repeated, the user can return to the page of "hotel A."

The determining unit 202 of Variation (1) determines the order of pages of the other hotel information items such that the pages of the other hotel information items are positioned on the opposite side of the hotel information item specified by the specifying unit 201 (i.e., the hotel information item of the hotel having the room specified by the tap) viewed from the room information item specified by the tap. The determining unit 202 may determine the order of all of the other hotel information items, or the order of only some of the other hotel information items. In the case where the order of only some of the other hotel information items is determined, the determining unit 202 may determine the order of the other hotel information items that are similar in content to the hotel information specified by the specifying unit 201. Similar in content means that, for example, addresses included in the hotel information, facilities, equipment, rate ranges, and consumer reviews are similar to each other.

When the right swipe is performed while the page of the hotel information specified by the specifying unit 201 is displayed, the display control unit 203 of Variation (1) displays pages of the other hotel information. The specific processing of the display control unit 203 when the right swipe is performed is the same as that described in Embodiment 1. Further, if the right swipe is performed while the pages of the other hotel information items are displayed and then the left swipe is performed, the user returns to the page of the original hotel information item. The specific processing of the display control unit 203 when the left swipe is performed is also the same as that described in Embodiment 1.

According to Variation (1), the other hotel information items can be displayed when the user swipes right. This enables the user to easily search rooms of other hotels, and improves the convenience of users.

(2) For example, in Variation (1), "hotel D" is the first page and there is no page on the left side of "hotel D" as shown in FIG. 14, although a page of an entire hotel information item may be positioned on the left side of "hotel D." The entire hotel information item is conceptually higher-level information of the hotel information. In the following, a case will be described in which the entire hotel information item corresponds to the top page of the hotel reservation, although, if there is no such a top page, the itinerary list displayed on the itinerary list screen G1 as shown in FIG. 3 may correspond to the entire hotel information item.

The data storage unit 200 of Variation (2) stores entire hotel information items. The entire hotel information items correspond to top pages of hotel reservation, and include, for example, information on districts, current campaigns, and feature stories of hotels.

The association database DB3 of Variation (2) stores an entire hotel information item in association with a plurality of hotel information items. For example, an entire ID for uniquely identifying entire hotel information is associated with a plurality of hotel IDs in the association database DB3. For example, the entire IDs and the hotel IDs have a one-to-many relationship.

Figure 16:
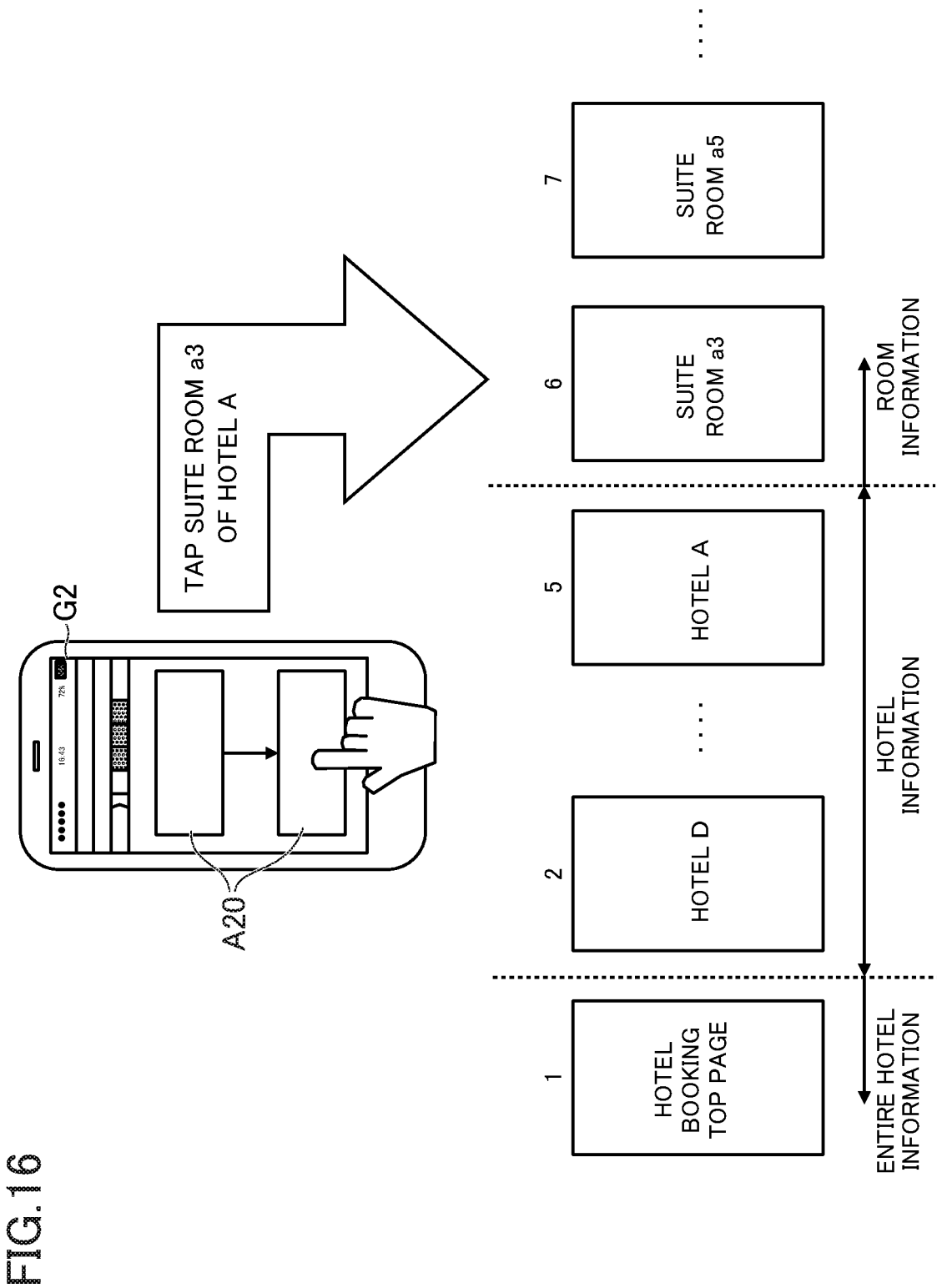
FIG. 16 is a diagram illustrating order of pages in Variation (2)

FIG. 16 is a diagram illustrating the order of pages in Variation (2). As shown in FIG. 16, the relative order of the hotel information items and the room information items is the same as that of Variation (1). In Variation (2), however, "hotel D" is not the first page, but a page of the entire hotel information item (e.g., top page of hotel reservation) is positioned before "hotel D." As such, when a user swipes right while the page of "hotel D" is displayed, the entire hotel reservation page is displayed.

Figure 17:
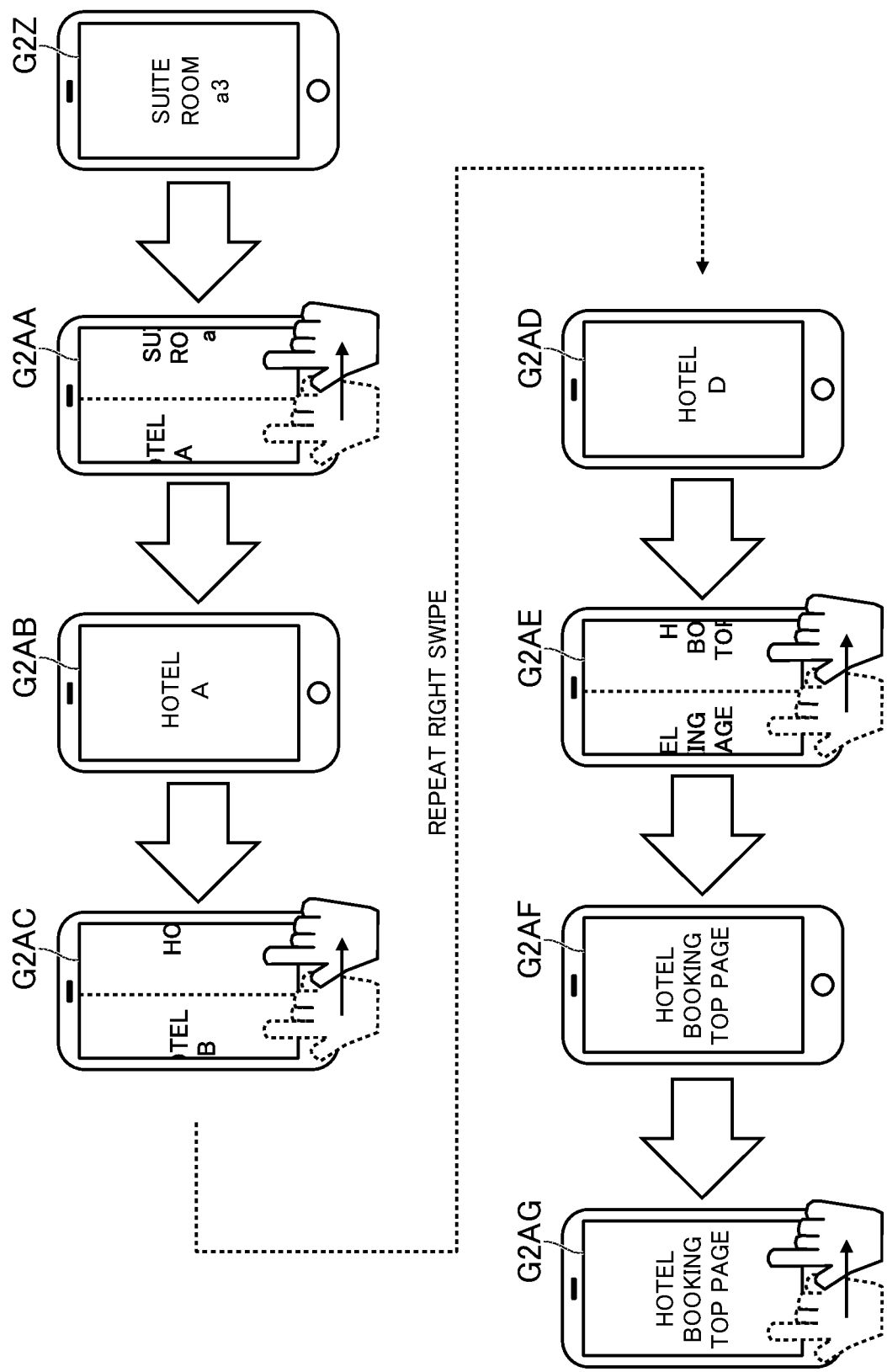
FIG. 17 is a diagram illustrating the itinerary screen changing when a user swipes right.

FIG. 17 is a diagram illustrating changes in the itinerary screen G2 when a user swipes right. As shown in FIG. 17, when the user swipes right (itinerary screen G2AA) while the page of tapped "suite room a3" is displayed (itinerary screen G2Z), the page of "suite room a3" is switched to the page of "hotel A" on the left side (itinerary screen G2AB).

As described in Variation (1), each time the user swipes right while the page of "hotel A" is displayed (itinerary screen G2AB), the user can sequentially move to pages on the left side (itinerary screens G2AA to G2AD). When the user swipes right (itinerary screen G2AE) while the page of "hotel D" is displayed (itinerary screen G2AD), the user can move to the page of the entire hotel information item on the left side (itinerary screen G2AF).

For example, hotels other than "hotels A to D" are searchable on the page of the entire hotel information item. The user can search and specify hotels on the page of the entire hotel information item based on entered keywords and search conditions. When the user specifies a room of the searched hotel on the page of the entire hotel information item, the processing executing unit 204 includes the room of the searched hotel in the itinerary in place of "suite room a3" tapped first.

The entire hotel reservation page is the first page, and there is no page on the left side. As such, when the user swipes right while the entire hotel reservation page is displayed (itinerary screen G2AF), the user does not move to other page (itinerary screen G2AG). Further, when the user swipes left while the entire hotel reservation page is displayed (itinerary screen G2F), the user can return to the page of "hotel D" on the right side of the displayed page. Subsequently, the user can return to the page of "hotel A" by repeating the left swipe.

In this Variation, the hotel information item specified by the specifying unit 201 is associated with the same entire information item as the other hotel information items in the association database DB3. When the right swipe is performed while the furthest page of the other hotel information item from the page of the hotel information item specified by the specifying unit 201 (i.e., the hotel information item of the hotel having the room specified by a tap) is displayed, the display control unit 203 of Variation (2) displays the page of the entire information item.

The furthest page of the other hotel information item is a page of the hotel information item which is positioned furthest in order from the page of the hotel information item specified by the specifying unit 201. In the example of FIG. 16, the hotel information item specified by the specifying unit 201 is "hotel A", and thus the furthest other hotel information item is "hotel D." The determining unit 202 of Variation (2) determines the order such that the page of the entire hotel information item is positioned next to the furthest other hotel information item. The display control unit 203 executes display control of the pages based on the determined order and swipes of the user. The specific processing of display control according to the swipes is the same as that described in Embodiment 1.

According to Variation (2), the entire hotel information item can be displayed when the right swipe is performed. This enables the user to easily search rooms of other hotels, and improves the convenience of users.

(3) For example, in Variation (1), pages of the other hotels are positioned on the left side of "hotel A", although the entire hotel reservation page may be positioned on the left side of "hotel A" without placing the pages of the other hotels.

Figure 18:
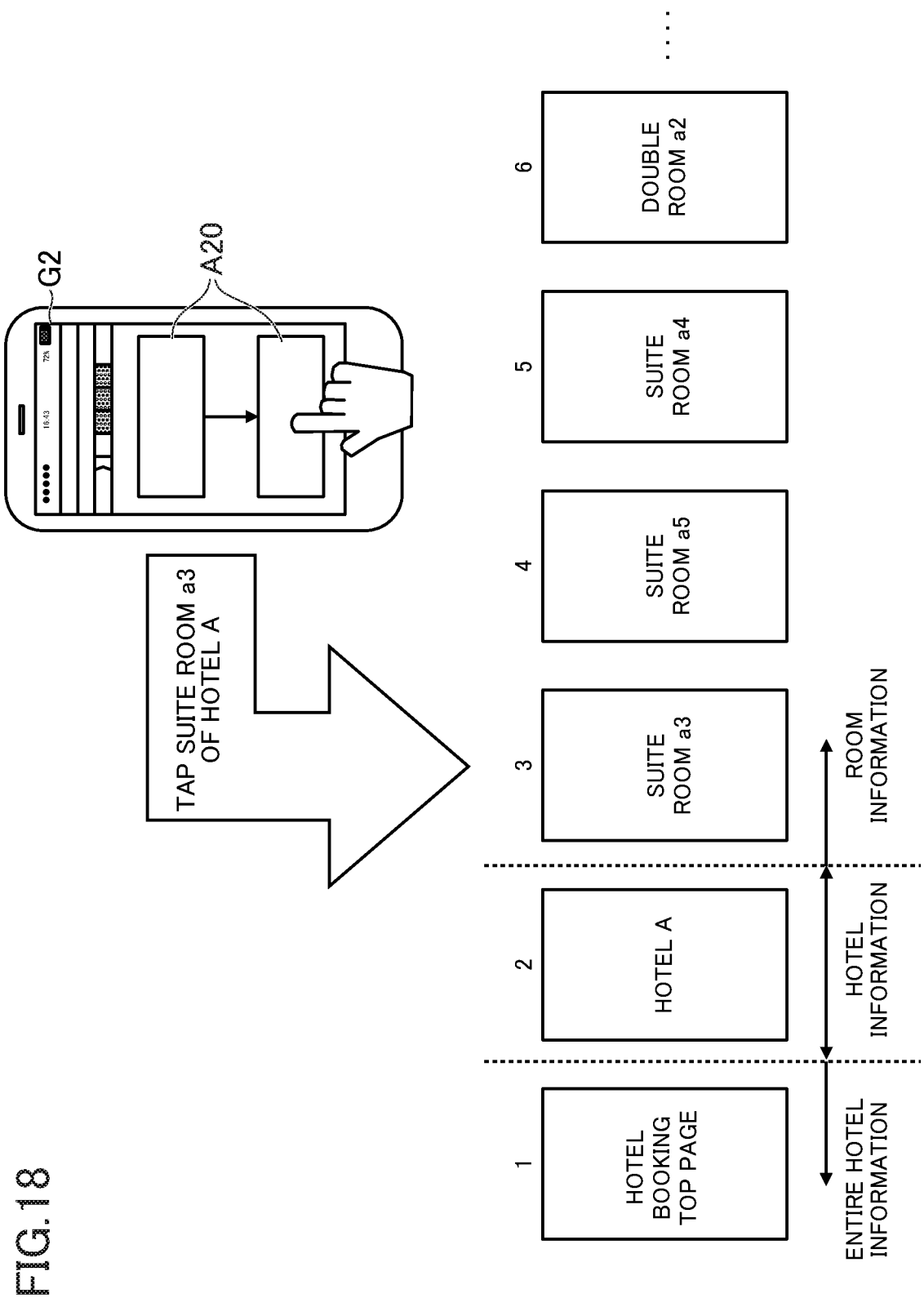
FIG. 18 is a diagram illustrating order of pages in Variation (3)

FIG. 18 is a diagram illustrating the order of pages in Variation (3). As shown in FIG. 18, the relative order of the hotel information item and the room information items is the same as Embodiment 1. However, in Variation (3), "hotel A" is not the first page, the entire hotel reservation page is positioned before "hotel A." As such, when the user swipes right while the page of "hotel A" is displayed, the entire hotel reservation page is displayed.

Figure 19:
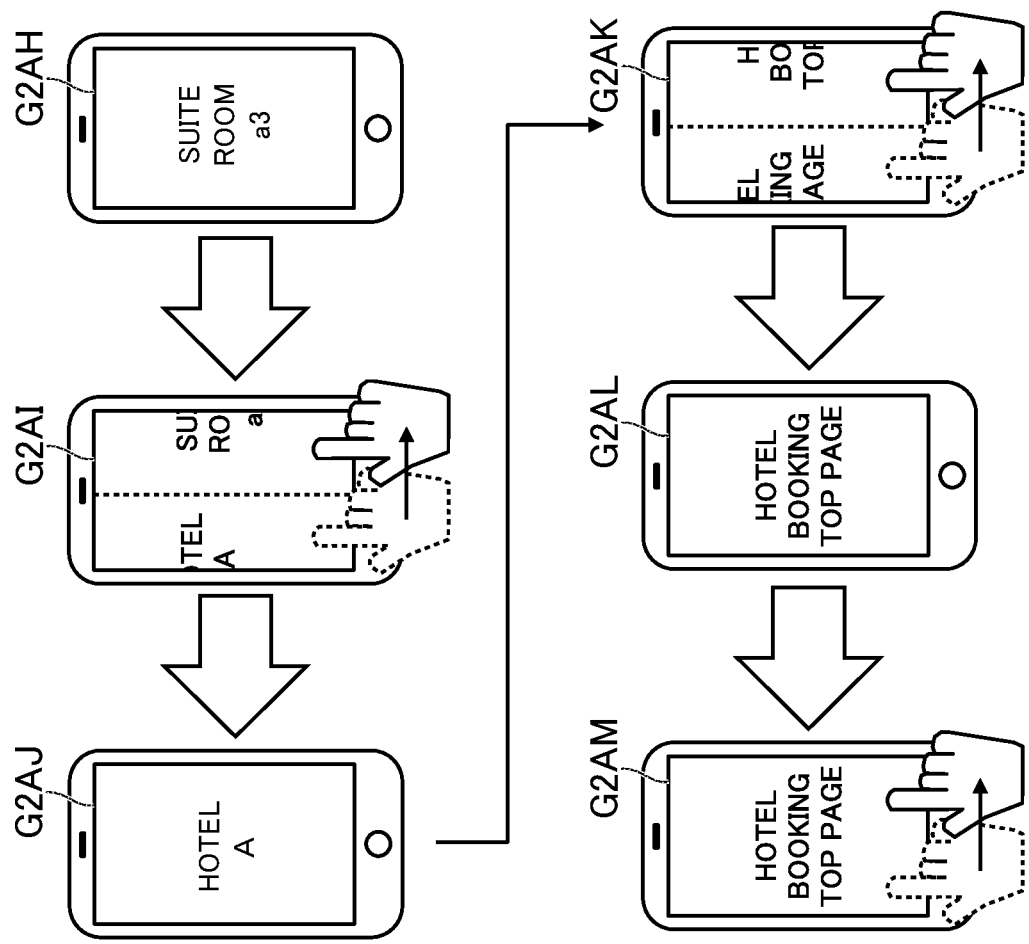
FIG. 19 is a diagram illustrating the itinerary screen changing when a user swipes right.

FIG. 19 is a diagram illustrating changes in the itinerary screen G2 when the user swipes right. As shown in FIG. 19, when the user swipes right (itinerary screen G2AI) while the page of the tapped "suite room a3" is displayed (itinerary screen G2AH), the page of "suite room a3" is switched to the page of "hotel A" on the left side (itinerary screen G2AJ).

Subsequently, when the user swipes right (itinerary screen G2AK) while the page of "hotel A" is displayed (itinerary screen G2AJ), the user can move to the entire hotel reservation page on the left side (itinerary screen G2AM).

The entire hotel reservation page is the first page and there is no page on the left side. As such, even if the user swipes right while the entire hotel reservation page is displayed (itinerary screen G2AL), the user does not move to the other pages (itinerary screen G2AM). Further, when the user swipes left while the entire hotel reservation page is displayed (itinerary screen G2L), the user can return to the page of "hotel A" on the right side.

In Variation (3), similarly to Variation (2), the hotel information item specified by the specifying unit 201 is associated with the same entire hotel information item as the other hotel information items, and the display control unit 203 displays the page of the entire information item when the right swipe is performed while the page of the specified hotel information item is displayed. The determining unit 202 of Variation (2) determines the order such that the page of the entire hotel information item is positioned next to the hotel specified by the specifying unit 201. The display control unit 203 executes display control of the pages based on the determined order and swipes of the user. The specific processing of display control according to the swipes is the same as that described in Embodiment 1.

According to Variation (3), the entire hotel information can be displayed when the right swipe is performed. This enables the user to easily search rooms of other hotels, and improves the convenience of the user.

2. Embodiment 2

Next, another embodiment of the display control system S will be described. In Embodiment 1, as shown in FIG. 8, when the user swipes left (itinerary screen G2N) while the page of "hotel A" is displayed (itinerary screen G2L), the user returns to the page of "suite room a3" tapped first (itinerary screen G2O), although the user may move to the page of the other hotel information item instead of returning to the page of "suite room a3."

After moving to the page of "hotel A" from the page of "suite room a3", moving to the page of the other hotel information item instead of returning to "suite room a3" is executed when a predetermined operation is performed on the page of "hotel A." If such an operation is not performed, the user may return to "suite room a3" as in Embodiment 1. The operation may include, for example, displaying an image such as "search other hotels" on the page of "hotel A", and selecting the image.

Figure 20:
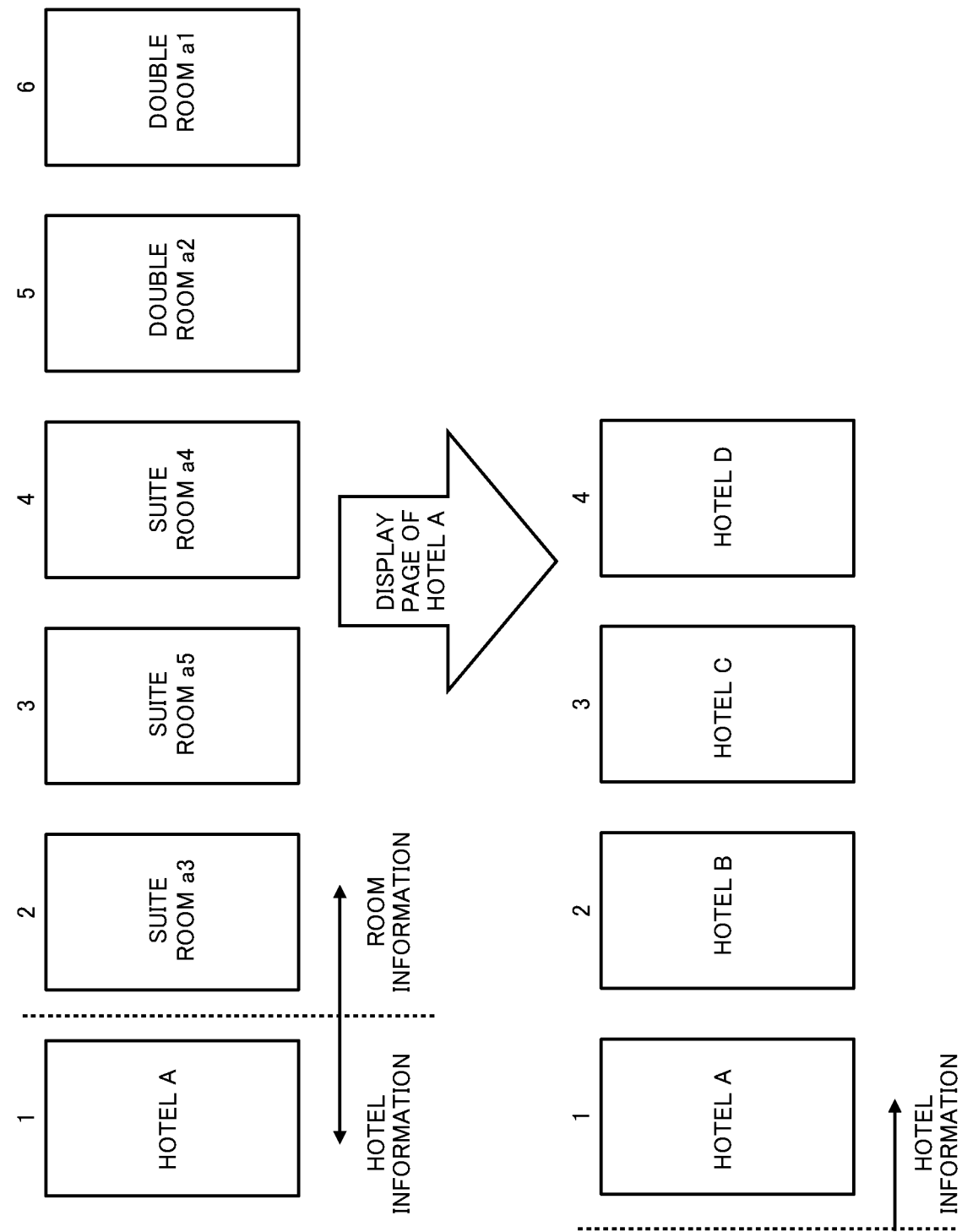
FIG. 20 a diagram illustrating order of pages in Embodiment 2.

FIG. 20 is a diagram illustrating the order of pages in Embodiment 2. As shown in FIG. 20, the order of the hotel information items and the room information items after "suite room a3" is tapped and until the page of "hotel A" is displayed is the same as that of Embodiment 1. In Embodiment 2, after the page of "hotel A" is displayed, pages of the other hotels, such as "hotel B", "hotel C", and "hotel D", are positioned following the page of "hotel A" instead of the rooms of the "hotel A." As such, when the user swipes left while the page of "hotel A" is displayed, the pages of these other hotels are displayed.

Figure 21:
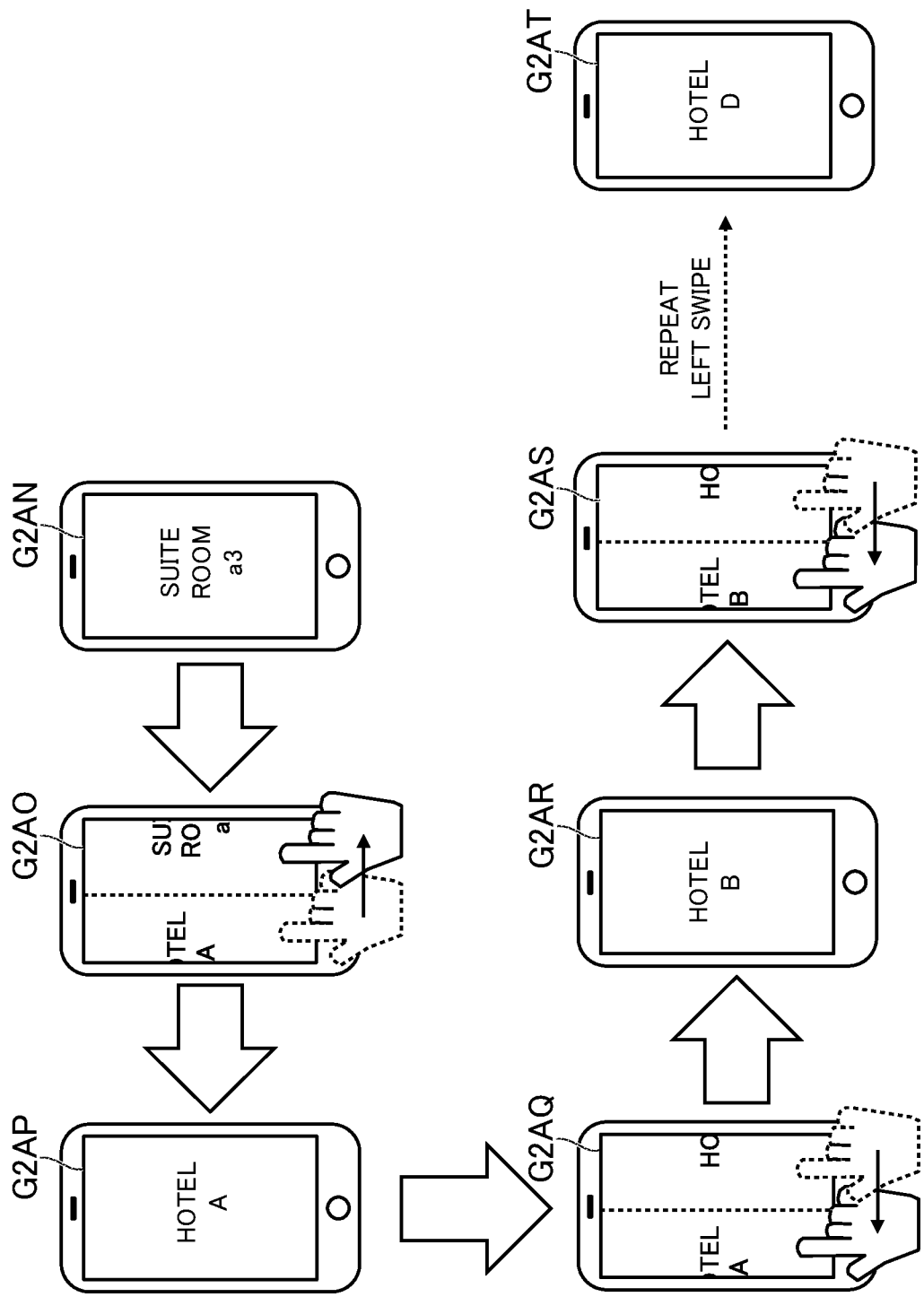
FIG. 21 illustrating the itinerary screen changing in Embodiment 2.

FIG. 21 is a diagram illustrating changes in the itinerary screen G2 in Embodiment 2. As shown in FIG. 21, when the user swipes right (itinerary screen G2A0) while the tapped page of "suite room a3" is displayed (itinerary screen G2AN), the page of "suite room a3" is switched to the page of "hotel A" on the left side (itinerary screen G2AP).

As described above, when the user moves to the page of "hotel A", the page arrangement on the right side is changed as shown in FIG. 20. As such, when the user swipes left (itinerary screen G2AQ) while the page of "hotel A" is displayed (itinerary screen G2AP), the user moves to the page of "hotel B" on the right side instead of returning to the page of "suite room a3" (itinerary screen G2AR). Subsequently, in the similar way, each time the user swipes right, the user can sequentially go to pages on the right side (itinerary screen G2AR to G2AT).

The page of "hotel D" is the last page and there is no page on the right side. As such, when the user swipes right while the page of "hotel D" is displayed (itinerary screen G2AT), the user does not move to other pages. On the other hand, if the right swipe is repeated while the page of "hotel D" is displayed (itinerary screen G2AT), the user can return to the page of "hotel A."

The determining unit 202 of Embodiment 2 determines whether the page of the hotel information item (e.g., "hotel A") specified by the specifying unit 201 is displayed on the display unit 15. For example, when the right swipe is performed while a room information item (e.g., "suite room a3") specified by a tap is displayed, the determining unit 202 determines that the page of the hotel information item specified by the specifying unit 201 is displayed.

If it is determined that the page of the hotel information item specified by the specifying unit 201 is displayed, the determining unit 202 determines the order of the other hotel information items such that pages of the other hotel information items replace pages of the room information items. The determining unit 202 may determine the order of all the other hotel information items, or the order of only some of the other hotel information items. If the order of only some of the hotel information items is determined, the determining unit 202 may determine the order of hotel information items that are similar in content to the hotel information item specified by the specifying unit 201.

The display control unit 203 of Embodiment 2 displays pages of other hotel information items when the left swipe is performed while the page of the specified hotel information item is displayed. The specific processing of the display control unit 203 when the left swipe is performed is also the same as described in Embodiment 1.

According to the display control system S of Embodiment 2, the other hotel information items can be displayed when the right swipe is performed after the hotel information item is displayed. This enables the user to easily search rooms of the other hotels, and thus improves the convenience of users.

Variation of Embodiment 2

In Embodiment 2, as shown in FIG. 21, "hotel A" is the first page and there is no page on the left side of "hotel A", although the entire hotel information page may be positioned on the left side of "hotel A", and the entire hotel information page may be displayed when the user swipes right.

Figure 22:
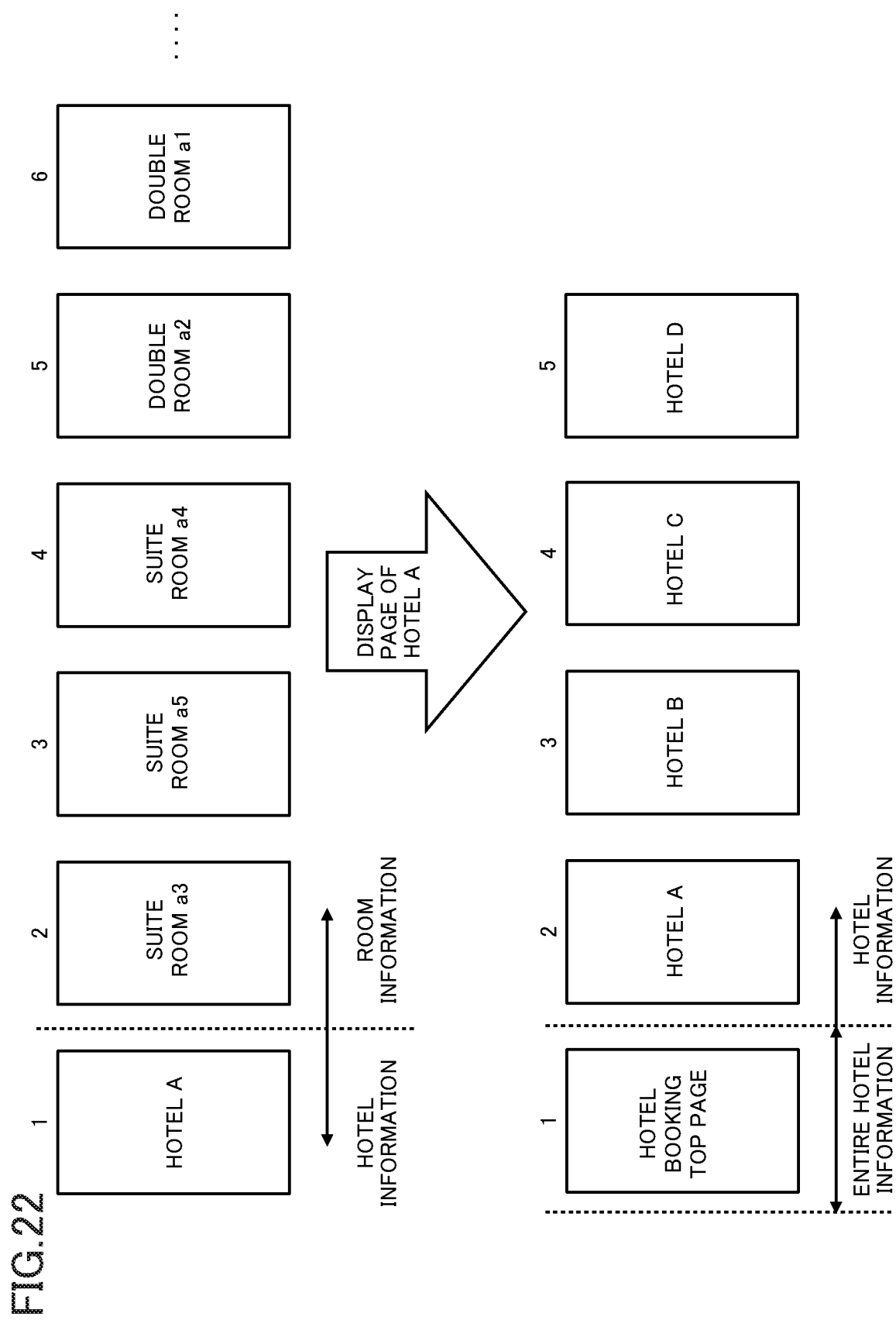
FIG. 22 a diagram illustrating order of pages in Variation of Embodiment 2.

FIG. 22 is a diagram illustrating the order of pages in the variation of Embodiment 2. As shown in FIG. 22, the order of the hotel information items after the page of "hotel A" is displayed is the same as described in Embodiment 2. However, in Embodiment 2, "hotel A" is not the first page, and page of the entire hotel information item (e.g., top page of hotel reservation) is positioned before the page of "hotel A."

As such, when the user swipes right while the page of "hotel A" is displayed, the page of the entire hotel information item is displayed.

Figure 23:
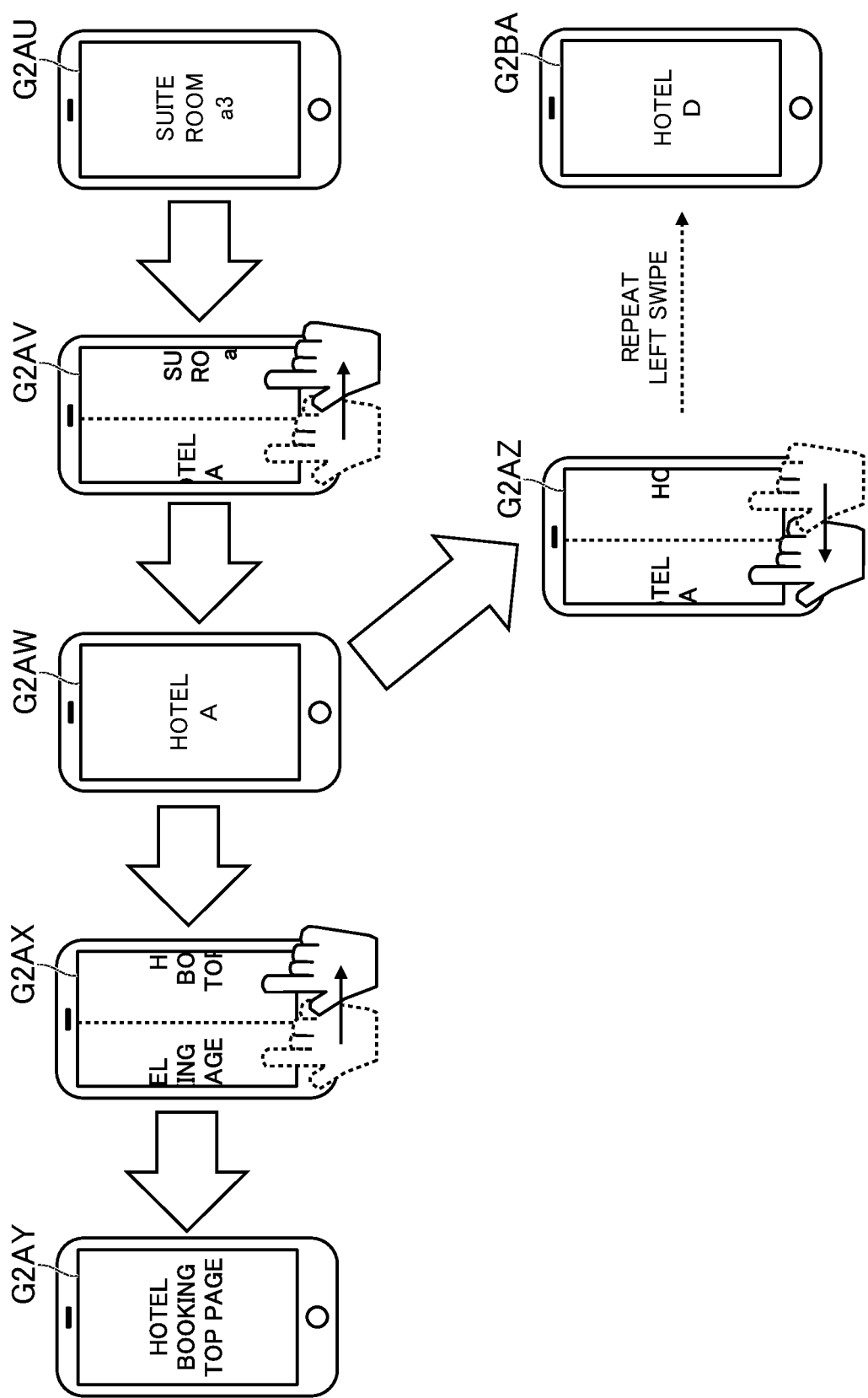
FIG. 23 is a diagram illustrating the itinerary screen changing when a user swipes right.

FIG. 23 is a diagram illustrating changes in the itinerary screen G2 when the user swipes right. As shown in FIG. 23, when the user swipes right (itinerary screen G2AV) while the tapped page of "suite room a3" is displayed (itinerary screen G2AU), the page of "suite room a3" is switched to the page of "hotel A" on the left side (itinerary screen G2AW).

Subsequently, when the user swipes right (itinerary screen G2AX) while the page of "hotel A" is displayed (itinerary screen G2AW), the user can move to the pages of the entire hotel information items on the left side (itinerary screen G2AY).

The entire hotel information item is the first page and there is no page on the left side. As such, if the user swipes right while the page of the entire hotel information item is displayed (itinerary screen G2AY), the user does not move to other pages. On the other hand, if the user swipes left while the entire hotel information page is displayed (itinerary screen G2AY), the user can return to the page of "hotel A."

As described in Embodiment 2, each time the user swipes left while the page of "hotel A" is displayed (itinerary screen G2AZ), the user can sequentially move to pages on the right side (itinerary screen G2BA). In this regard, this variation is the same as Embodiment 2.

In this variation, the hotel information item (e.g., hotel information of "hotel A") specified by the specifying unit 201 is associated with the same entire information item as the other hotel information items. In this regard, this variation is the same as Variation (2) of Embodiment 1.

The determining unit 202 of this variation determines the order such that the page of the entire hotel information item is positioned next to the hotel specified by the specifying unit 201. The display control unit 203 displays the page of the entire information item when the right swipe is performed while the page of specified hotel information item is displayed. The specific processing of the display control unit 203 when the right swipe is performed is the same as described in Embodiment 1.

According to the variation of Embodiment 2, the entire hotel information item can be displayed when the right swipe is performed. This enables the user to easily search rooms of the other hotels, and thus improves the convenience of users.

3. Embodiment 3

In Embodiment 1, as shown in FIG. 8, when the right swipe is performed (itinerary screen G2M) while the page of "hotel A" is displayed (itinerary screen G2L), the display does not change because there is no page on the left side. However, the page of the entire hotel information item may be positioned on the left side of "hotel A", and an overall travel reservation page may be positioned on the left side of the page of the entire hotel information.

Figure 24:
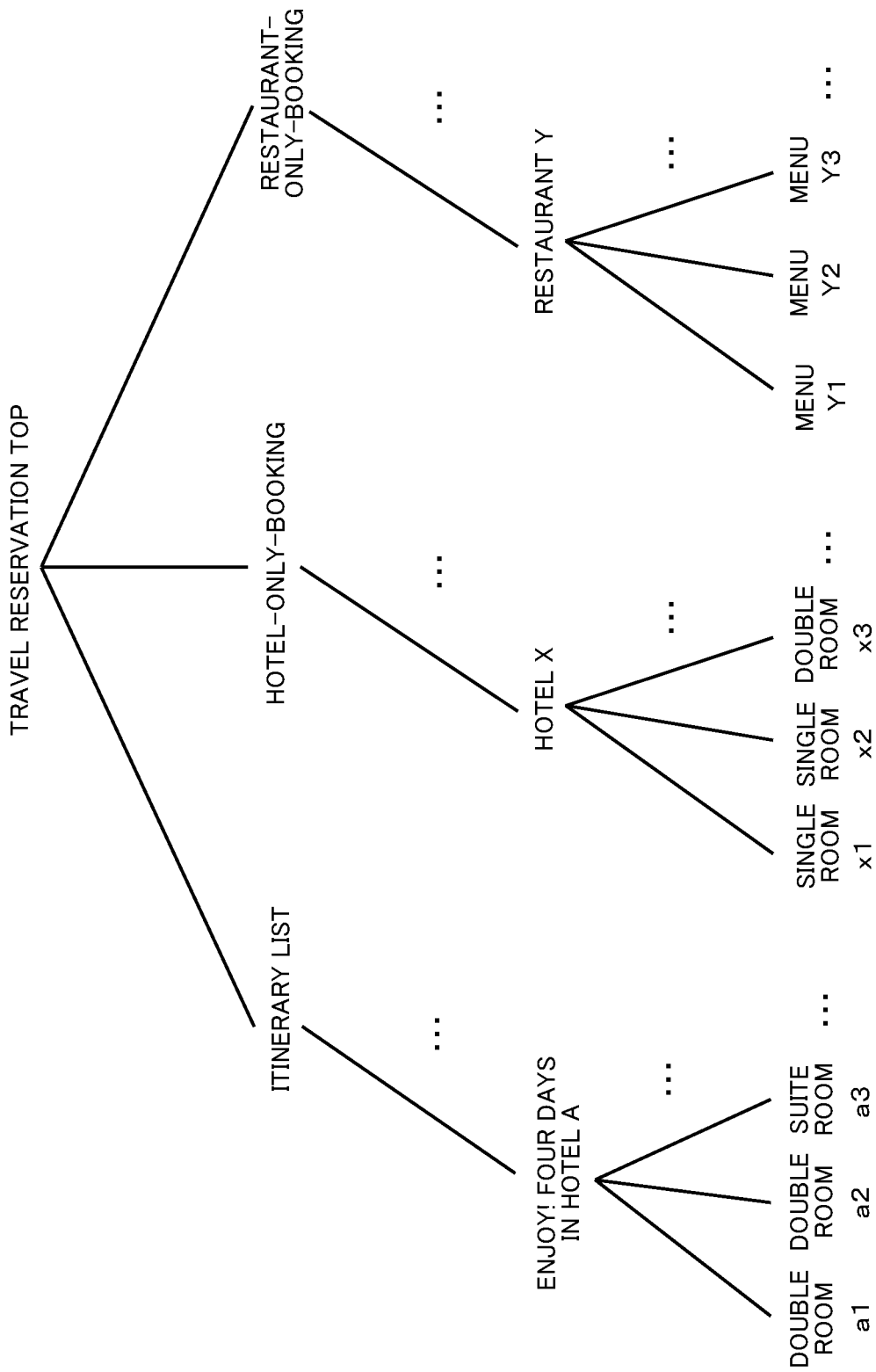
FIG. 24 is a conceptual diagram of information in Embodiment 3.

FIG. 24 is a conceptual diagram of information in Embodiment 3. As shown in FIG. 24, in Embodiment 3, the itinerary list screen G1 is not a top page, but there is a top page of all of the travel reservation services as a higher-level page. In the following, the itinerary list screen G1 is merely one of lower-level pages, and, for example, there are a top page of hotel-only-booking pages for booking only hotels and a top page of restaurant-only-booking pages for booking only restaurants.

Thus, conceptually, there is overall travel information (e.g., information corresponding to the top page of all of the travel reservation services) as the first level of travel reservations. As the second level, there is individual service information (e.g., entire hotel information) in the travel reservation system. That is, the entire hotel information described as the first level in Embodiment 1 is the second level in Embodiment 3, and there exists conceptually higher level information.

In the third level or below, there are information items for respective services. For example, for a hotel booking service, third level information and fourth level information respectively include hotel information and room information as described in Embodiment 1. Further, for example, for a restaurant reservation service, the third level is restaurant information, and the fourth level is specific information on menus provided by the restaurant. For example, for an optional tour booking service, the third level is tour company information, and the fourth level is specific information on optional tours provided by the tour company.

In Embodiment 3, when the user repeats the right swipe using the information of the concept as described above, the user sequentially move to pages of conceptually higher-level information.

FIG. 25 is a diagram illustrating the order of pages in Embodiment 3. As shown in FIG. 25, the order of the hotel information page and the room information pages is the same as that in Embodiment 1. In Embodiment 3, however, "hotel A" is not the first page, and a page for entire hotel reservations (e.g., top page of hotel reservations) is positioned before "hotel A", and a page for overall travel reservations (e.g., top page of travel reservation system) is positioned before the page for entire hotel reservations. As such, when the user swipes right while the page of "hotel A" is displayed, the page for entire hotel reservations is displayed, and then the user swipes right, the page for overall travel reservations is displayed.

FIG. 26 is a diagram illustrating changes in the itinerary screen G2 when the user swipes right. As shown in FIG. 26, when the user swipes right (itinerary screen G2BC) while the tapped page of "suite room a3" is displayed (itinerary screen G2BB), the page of "suite room a3" is switched to the page of "hotel A" on the left side (itinerary screen G2BD).

Subsequently, when the user swipes right (itinerary screen G2BE) while the page of "hotel A" is displayed (itinerary screen G2BD), the user can move to the page of the entire hotel information on the left side (itinerary screen G2BF). Further, when the user swipes right (itinerary screen G2BG) while the page of the entire hotel information is displayed (itinerary screen G2BF), the user can move to the overall information page for travel reservations on the left side (itinerary screen G2BH).

The overall information page for travel reservations is the first page, and there is no page on the left side, and thus the user do not move to the other page even if the user swipes right while the overall information page for travel reservations is displayed (itinerary screen G2BH). However, if there is conceptually higher level of information, the user may sequentially move to pages of higher-level information whenever the user swipes right.

When the user swipes left while the overall information page for travel reservations is displayed (itinerary screen G2BH), the user may return to the entire hotel reservation page on the right side. Similarly, in the following, the user may sequentially move to pages of conceptually lower-level information whenever the user swipes right.

The data storage unit 200 in Embodiment 3 stores the entire hotel information and the overall travel information. The details of the entire hotel information are as described in Variation (2) of Embodiment 1. The overall travel information is information corresponding to the top page of the travel reservations, and includes, for example, information about types of services provided in the travel reservation services, current campaigns, and feature stories of the services.

In Embodiment 3, the hotel information item specified by the specifying unit 201 is associated with the same entire hotel information item as the other hotel information items. The entire hotel information item is associated with the same overall travel information item similarly to the other entire information items (e.g., entire restaurant information items and entire optional tour information items).

Similarly to Variation (2) of Embodiment 1, the association database DB3 of Embodiment 3 stores a plurality of hotel information items in association with an entire hotel information item. Further, the association database DB3 associates an overall travel information item with a plurality of entire information items, such as entire hotel information items, entire restaurant information items, and entire optional tour information items. For example, an overall ID for uniquely identifying overall travel information is associated with a plurality of entire IDs for uniquely identifying entire information in the association database DB3. For example, the overall IDs and the entire IDs have a one-to-many relationship.

The determining unit 202 of Embodiment 3 determines the order such that the page of the entire hotel information item is positioned next to the page of the hotel information item, and the page of the overall information for travel reservations is positioned next to the page of the entire hotel information item. The display control unit 203 of Embodiment 3 displays the entire information item when the hotel information item specified by the specifying unit 201 is displayed and the right swipe is performed. The display control unit 203 displays the overall information when the entire information is displayed and the right swipe is performed. The display control unit 203 executes display control of pages based on the determined order and the swipes of the user. The specific processing of the display control according to the swipe is the same as described in Embodiment 1.

According to the display control system S of Embodiment 3, each time the user swipes right, pages of the hotel information, the entire hotel information, and the overall information for travel reservations are sequentially displayed. This enables the user to easily search other hotels or services, and thus improves the convenience of the user. Further, each time the user swipes right, pages of conceptually higher level information are sequentially displayed, and the user can move to a page of lower-level information by a tap, for example. This eliminates the need for displaying links to higher/lower levels on each page, and thus serves to save space on a display screen.

4. Embodiment 4

The aspects described in Embodiments 1 to 3 include the case in which pages of the other hotel information items (hotels other than the hotel having the room initially tapped) can be displayed as shown in FIGS. 15, 17, 21, and 23. In these aspects, when the page of one of the other hotel information items is specified, a room information item associated with the specified hotel information item may be displayed.

FIG. 27 is a diagram illustrating changes in the itinerary screen G2 in Embodiment 4. Here, an example is explained in which pages are arranged as described in Variation (2) of Embodiment 1 (FIG. 14), and the same processing may be executed for other aspects. As shown in FIG. 27, each time the user swipes right while the tapped page of "suite room a3" is displayed (itinerary screen G2BI), the user can sequentially move to pages on the left side (itinerary screens G2BJ to G2BM).

For example, while the page of "hotel B" is displayed (itinerary screen G2BM) and the user taps the page (itinerary screen G2BN), the user can move to the page of the room information item of the room in "hotel B" (itinerary screen G2BO).

While a page of one of the other hotel information items is displayed, when the user specifies such a page, the display control unit 203 displays a page of a room information item associated with the specified other hotel information item. The hotel information item may be specified by a user in the same way as the room information item as described in Embodiment 1, or by a computer. The meaning of specifying is the same as described in Embodiment 1. Here, an example will be described in which another room information item is specified by a tap.

The display control unit 203 refers to the association database DB3 and specifies a room ID associated with the hotel ID of the specified other hotel information item. A room ID to be specified may be determined on a random basis, or a predetermined room may be specified. Alternatively, a room ID to be specified may be determined so that a room having a lot of reservations is specified, or may be determined based on the room initially tapped as in Variation described later. The display control unit 203 refers to the room information database DB2 and generates display data of a page based on the room information item associated with the specified room ID. The method for generating the display data based on the room information item and the method for displaying pages on the user terminal 10 are the same as described in Embodiment 1.

According to the display control system S in Embodiment 4, when a page of the other hotel information item is displayed and tapped, pages of the room information items of the tapped hotel can be displayed. This enables users to easily book rooms of the other hotels, and thus improves the convenience of users.

Variation of Embodiment 4

In Embodiment 4, when displaying a room of the other hotel, a room having the condition similar to that of the room initially tapped may be displayed. That is, the display control unit 203 may display the page of the room information item associated with the other hotel information item specified by the tap based on the room information item specified by the tap.

For example, each room information item is associated with a category, and thus, the display control unit 203 determines a page to display based on the category of the room information item specified by the tap and the category of the room information item associated with the other hotel information item specified by the tap. In this case, the display control unit 203 may display a page of the room information item having the matched category, or a page of the room information item having the similar category.

For example, the display control unit 203 may determine a page to display based on a rate of the room information item specified by the tap. In this case, the determining unit 202 may display a page of a room information item having a small difference in rates from the room information item specified by the tap. For example, the display control unit 203 may determine a page to display based on a keyword included in the room information item specified by the tap. In this case, the display control unit 203 may display a page of the room information item having the largest number of keywords that match keywords included in the room information item specified by the tap. Alternatively, for example, the display control unit 203 may determine a page to display based on the number of people that can stay, a layout, and a size of the room included in the room information item specified by the tap.

According to the variation of Embodiment 4, when a page of the other hotel information item is displayed and then tapped, a page of the room information similar in conditions to the room information item initially tapped can be displayed. This improves the convenience of users.

5. Other Variations

The present invention is not to be limited to the above described embodiment and can be changed as appropriate without departing from the spirit of the invention. For example, two or more of the Embodiments 1 to 4 can be combined.

For example, in the above example, the display control system S is used in a travel reservation service, although the display control system S may be used in any other services. For example, in a case where the display control system. S is used in electronic commerce, shop information of products may correspond to common information, and product information may correspond to individual information. In addition, for example, product categories may correspond to common information, and product information may correspond to individual information. In this case, a product can be associated to multiple product categories, and thus common information and individual information may have one-to-many relationship.

For example, in a case where the display control system S is used in an electronic book service, information on publishers, authors, and writers may correspond to common information, and information on books and comics may correspond to individual information. For example, in a case where the display control system S is used in a financial service, financial institutions may correspond to common information, and information on each financial service may correspond to individual information.

For example, the specifying unit 201, the determining unit 202, and the processing executing unit 204 may be implemented by the user terminal 10. In this case, these functions are implemented mainly by the control unit 11. In this case, the user terminal 10 may acquire information stored in the hotel information database DB1, the room information database DB2, and the association database DB3, so that the specifying unit 201 may specify hotel information items and other room information items, or the determining unit 202 may determine the order of the items. The processing executing unit 204 may send the room information item specified by the user to the server 20, thereby executing predetermined processing. For example, the functions implemented by the display control unit 203 of the server 20 may be implemented by the user terminal 10. In this case, the user terminal 10 acquire information stored in the hotel information database DB1, the room information database DB2, and the association database DB3, thereby executing display control of each page.

For example, the functions may be shared between the user terminal 10 and the server 20. For example, the specifying unit 201 is implemented in the user terminal 10, and the other functions may be implemented in the server 20. In this case, the user terminal 10 may send data indicating results the specified by the specifying unit 201 to the server 20. For example, the determining unit 202 may be implemented in the user terminal 10, and the other functions may be implemented in the server 20. In this case, the user terminal 10 may send data indicating results determined by the determining unit 202 to the server 20. For example, the processing executing unit 204 may be implemented in the user terminal 10, and the other functions may be implemented in the server 20. In this case, the user terminal 10 may send the room information item specified by the user to the server 20, thereby executing the predetermined processing.

The invention claimed is:

1. A display control system comprising at least one processor configured to, based on one of a plurality of individual information items associated with a common information item being specified, perform (i)-(iii):
   (i) display a page of a specified individual information item on a display;
   (ii) specify the common information item associated with the specified individual information item, and other individual information items associated with the specified common information item; and
   (iii) determine orders of neighboring pages of the specified individual information item such that:
      the page of the specified individual information item is positioned between a page of the specified common information item, as a previous page in a first predetermined direction, and pages of the other individual information items, as next pages in the first predetermined direction; and
      based on a first page turning operation instructing to turn to a next page in the first predetermined direction being performed in a state in which the page of the specified individual information item is displayed, a page of one of the other individual information items is to be displayed as the next page;
   wherein the at least one processor is further configured to:
      receive, in the state in which the page of the specified individual information item is displayed, a second page turning operation instructing to turn to a previous page in a second predetermined direction, which is opposite to the first predetermined direction;
      based on the second page turning operation, (iv) control to display the page of the specified common information item, and (v) change orders of neighboring pages of the specified common information item such that pages of other common information items are positioned as next pages of the specified common information item in the first predetermined direction to replace the pages of the specified individual information item and the other individual information items; and
      receive, in a state in which the page of the specified common information item is displayed according to a result of the second page turning operation, a third page turning operation instructing to turn to a next page in the first predetermined direction, and based on the third page turning operation, control to display a page of one of the other common information items, which are positioned as the next pages of the specified common information in the first predetermined direction.

2. The display control system according to claim 1, wherein
each common information item is associated with three or more individual information items, and
the at least one processor is configured to control to sequentially display the pages of the other individual information items each time a page turning operation instructing to turn to a next page in the first predetermined direction is performed while a page of any individual information item associated with the common information item is displayed.

3. The display control system according to claim 2, wherein
the at least one processor is configured to determine orders of the pages of the other individual information items based on the specified individual information item.

4. The display control system according to claim 3, wherein
the at least one processor is configured to determine the orders of the pages of the other individual information items based on a category of the specified individual information item and categories of the respective other individual information items.

5. The display control system according to claim 1, wherein
the specified common information item is associated with an entire information item with which the other common information items are associated, and
the at least one processor is configured to control to display a page of the entire information item based on a fourth page turning operation being performed in the second predetermined direction while the page of the specified common information item is displayed.

6. The display control system according to claim 1, wherein
the specified common information item is associated with an entire information item with which the other common information items are associated,
the entire information item is associated with an overall information item with which other entire information items are associated,
the at least one processor is configured to control to display a page of the entire information item based on a fifth page turning operation being performed in the second predetermined direction while the page of the specified common information item is displayed, and control to display a page of the overall information item based on a sixth page turning operation being performed in the second predetermined direction while the page of the entire information item is displayed.

7. The display control system according to claim 1, wherein
based on the page of the one of the other common information items being displayed and then specified by a user operation, the at least one processor is configured to control to display a page of an individual information item associated with the specified one of the other common information items.

8. The display control system according to claim 7, wherein
the at least one processor is configured to control to display the page of the individual information item associated with the specified one of the other common information items based on the specified individual information item.

9. The display control system according to claim 1, wherein
each common information item is associated with three or more individual information items, and
the at least one processor is configured to control to, based on a user's page turning operation, display some of the pages of the other individual information items based on the specified individual information item.

10. The display control system according to claim 1, wherein
the at least one processor is configured to execute predetermined processing based on a page of one of the plurality of individual information items being displayed on the display and specified by a user.

11. The display control system according to claim 1, wherein
the individual information item is information relating to a product or a service, and
the common information item is information relating to a provider of the product or the service.

12. The display control system according to claim 1, wherein
the first, second, or third page turning operation is performed by changing a touch position on a touch panel.

13. The display control system according to claim 1, wherein
the at least one processor is further configured to, based on a seventh page turning operation being performed in the first predetermined direction, subsequent to the third page turning operation while the page of one of the other common information items is displayed, control to display a page of another one of the other common information items.

14. A display control method comprising performing operations (i)-(iii), based on one of a plurality of individual information items associated with a common information item being specified:
(i) displaying a page of a specified individual information item on a display;
(ii) specifying the common information item associated with the specified individual information item, and other individual information items associated with the specified common information item; and
(iii) determining orders of neighboring pages of the specified individual information item such that:
the page of the specified individual information item is positioned between a page of the specified common information item, as a previous page in a first predetermined direction, and pages of the other individual information items, as next pages in the first predetermined direction; and
based on a first page turning operation instructing to turn to a next page in the first predetermined direction being performed in a state in which a page of the specified individual information item is displayed, a page of one of the other individual information items is to be displayed as the next page,
wherein the method further comprises:
receiving, in the state in which the page of the specified individual information item is displayed, a second page turning operation instructing to turn to a previous page in a second predetermined direction, which is opposite to the first predetermined direction;

based on the second page turning operation, (iv) controlling to display the page of the specified common information item, and (v) changing orders of neighboring pages of the specified common information item such that pages of other common information items are positioned as next pages of the specified common information item in the first predetermined direction to replace the pages of the specified individual information item and the other individual information items; and receiving, in a state in which the page of the specified common information item is displayed according to a result of the second page turning operation, a third page turning operation instructing to turn to a next page in the first predetermined direction, and based on the third page turning operation, controlling to display a page of one of the other common information items, which are positioned as the next pages of the specified common information in the first predetermined direction.

15. A non-transitory computer-readable information storage medium for storing a program for causing a computer to, based on one of a plurality of individual information items associated with a common information item being specified, perform (i)-(iii):

(i) display a page of a specified individual information item on a display;

(ii) specify the common information item associated with the specified individual information item, and other individual information items associated with the specified common information item; and (iii) determine orders of neighboring pages of the specified individual information item such that:

the page of the specified individual information item is positioned between a page of the specified common information item, as a previous page in a first predetermined direction, and pages of the other individual information items, as next pages in the first predetermined direction; and based on a first page turning operation instructing to turn to a next page in the first predetermined direction being performed in a state in which the page of the specified individual information item is displayed, a page of one of the other individual information items is to be displayed as the next page, wherein the computer is further configured to, based on the program:

receive, in the state in which the page of the specified individual information item is displayed, a second page turning operation instructing to turn to a previous page in a second predetermined direction, which is opposite to the first predetermined direction;

based on the second page turning operation, (iv) control to display the page of the specified common information item, and (v) change orders of neighboring pages of the specified common information item such that pages of other common information items are positioned as next pages of the specified common information item in the first predetermined direction to replace the pages of the specified individual information item and the other individual information items; and receive, in a state in which the page of the specified common information item is displayed according to a result of the second page turning operation, a third page turning operation instructing to turn to a next page in the first predetermined direction, and based on the third page turning operation, control to display a page of one of the other common information items, which are positioned as the next pages of the specified common information in the first predetermined direction.

\* \* \* \* \*